(12) United States Patent
Nakajima et al.

(10) Patent No.: US 8,127,092 B2
(45) Date of Patent: Feb. 28, 2012

(54) MIGRATION MANAGEMENT BASED ON DESTINATION PERFORMANCE INFORMATION

(75) Inventors: Jun Nakajima, Kawasaki (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 555 days.

(21) Appl. No.: 12/271,615

(22) Filed: Nov. 14, 2008

(65) Prior Publication Data

US 2010/0082899 A1    Apr. 1, 2010

(30) Foreign Application Priority Data

Sep. 29, 2008  (JP) ................................ 2008-251346

(51) Int. Cl.
*G06F 12/16* (2006.01)
(52) U.S. Cl. ........................................ 711/154; 711/114
(58) Field of Classification Search ........................ None
See application file for complete search history.

(56) References Cited

U.S. PATENT DOCUMENTS

| 6,802,062 | B1 | 10/2004 | Oyamada et al. | |
|---|---|---|---|---|
| 7,127,555 | B2 * | 10/2006 | Takeda et al. | 711/111 |
| 2003/0221063 | A1 * | 11/2003 | Eguchi et al. | 711/114 |

* cited by examiner

*Primary Examiner* — Than Nguyen
(74) *Attorney, Agent, or Firm* — Foley & Lardner LLP

(57) ABSTRACT

Implementing migration of a computer or data in consideration of the performance of an entire computer system is disclosed. A management computer is coupled to a computer 41000 and to a storage system 51000 having RAID groups 51220 and 51221 for providing logical volumes 51210 to 51212. When a predetermined event occurs at a resource on an I/O path from the computer 41000 to the RAID groups 51220 and 51221, the applicable I/O path is extracted. Moreover, it is determined whether or not there is another I/O path used by another computer and another logical volume, which does not share any resources and does not use the extracted I/O path. When there is the other I/o path, it is determined whether or not a performance of a resource contained therein remains within a preset range of a threshold requirement in the case of migrating the computer 41000 and the logical volumes 51210 to 51212 to the other I/O path. If the performance falls within the range, the other I/O path is determined as a migration destination.

12 Claims, 19 Drawing Sheets

FIG. 5

SERVER STORAGE MAPPING TABLE

| COMPUTER NAME | VOLUME NUMBER | STORAGE NAME | DATA I/F NUMBER | LOGICAL VOLUME NUMBER | RAID GROUP NUMBER |
|---|---|---|---|---|---|
| COMPUTER A | Vol-A | STORAGE A | p1 | lv1 | RG1 |
| COMPUTER A | Vol-B | STORAGE A | p1 | lv2 | RG1 |
| COMPUTER B | Vol-C | STORAGE A | p2 | lv3 | RG2 |

11151A  11151B  11151C  11151D  11151E  11151F

11151

PERFORMANCE INFORMATION TABLE

| STORAGE NAME | LOGICAL VOLUME NUMBER | I/O Response Time | I/O Per Second | I/O Transfer Rate |
|---|---|---|---|---|
| STORAGE A | lv1 | 20 | 15 | 10 |
| STORAGE A | lv2 | 0 | 0 | 0 |
| STORAGE A | lv5 | 10 | 10 | 20 |

FIG. 6A

PERFORMANCE INFORMATION TABLE

| STORAGE NAME | RAID GROUP NUMBER | I/O Response Time | I/O Per Second | I/O Transfer Rate |
|---|---|---|---|---|
| STORAGE A | RG1 | 20 | 15 | 10 |
| STORAGE A | RG2 | 10 | 10 | 10 |
| STORAGE A | RG3 | 45 | 40 | 20 |

FIG. 6B

CONFIGURATION/PERFORMANCE HISTORY TABLE

11153

| Time Stamp | SERVER PROGRAM | COMPUTER NAME | VOLUME NUMBER | OS | APP | IOPS |
|---|---|---|---|---|---|---|
| 2010/0323 /08:00 | SERVER PROGRAM A | COMPUTER A | Vol-A | Win XP | Oracle | 5 |
| 2010/0323 /09:00 | SERVER PROGRAM B | COMPUTER A | Vol-B | Solaris | Oracle | 8 |
| 2010/0323 /10:00 | SERVER PROGRAM C | COMPUTER B | Vol-C | Win XP | Oracle | 4 |

11153

| STORAGE NAME | DATA I/F NUMBER | LOGICAL VOLUME NUMBER | I/O Response Time | RAID GROUP NUMBER | IOPS |
|---|---|---|---|---|---|
| A | p1 | lv1 | 0.8ms | RG1 | 15 |
| A | p1 | lv2 | 1.0ms | RG1 | 15 |
| A | p2 | lv3 | 0.5ms | RG2 | 10 |

FIG. 7

RESERVED VOLUME TABLE 11154
11154A  11154B  11154C  11154D  11154E

| OS | APP | STORAGE NAME | LOGICAL VOLUME | RAID GROUP |
|---|---|---|---|---|
| WinXP | Oracle | STORAGE A | lv3 | RG2 |
| Solaris | NUMERICAL CALCULATION | STORAGE A | lv4 | RG3 |

MIGRATION MANAGEMENT BASED ON DESTINATION PERFORMANCE INFORMATION

CROSS-REFERENCE TO RELATED APPLICATIONS

The present application claims a priority from Japanese Patent Application No. 2008-251346 filed on Sep. 29, 2008, the content of which herein incorporated by reference.

BACKGROUND OF THE INVENTION

1. Field of the Invention

The present invention relates to a management computer and an operating method thereof. More specifically, the present invention relates to a management computer for migration management of a computer or a logical volume, the management computer being executed, when the performance of a computer system is degraded, in consideration of any one of, or both of, the performance of an input-output (I/O) path from the computer to the logical volume of a storage system and the performance of a memory device in a storage system, and the present invention relates also to an operating method thereof.

2. Related Art

As a technique for controlling migration of a computer or volume data in a computer system, for example, Patent Document 1 discloses a technique to migrate an operating system (OS) and applications that are in operation on a certain computer to another computer while considering resource information of a main memory unit, an extended memory unit, a processor, input-output channels, and the like, which are included in the OS of the source computer.

In addition, a technique for enabling cooperative operations of migration of an OS and applications on a computer and of migration of storage volume data has been publicly known. See, for example, U.S. Pat. No. 6,802,062.

As described above, conventionally, it has been possible to perform a configuration change operation while establishing cooperation between migration of the computer and migration of the storage volume data. However, from the viewpoint of performance, only the performance on the computer has been considered for migration whereas the performance on the storage side has not been considered therefor. Thus, it has been difficult, in a case of performance degradation, to implement migration of the computer or the volume data in consideration of the performance of the entire computer system that includes a server and storage, for example.

SUMMARY OF THE INVENTION

An object of the present invention is to perform migration management of a computer or a logical volume in the case of performance degradation of a computer system, while considering the performance of any one of or both of an I/O path from the computer to the logical volume of a storage system, and a memory device in the storage system.

An aspect of the present invention for solving the above-described and other problems is a management computer mutually coupled to a computer on which software is working and to a storage system having a memory device providing a logical volume to be used by the software, the management computer comprising a performance dependence relation determining unit implemented through executing a corresponding program by a processor of the management computer, the performance dependence relation determining unit that extracts an I/O path containing a resource in which a predetermined event occurs, when the event occurs in the resource contained in the I/O path from the computer to the memory device, the memory device belonging to the logical volume used by the software working on the computer; and determines whether or not there is another I/O path not shared by any resources contained in the I/O path and used by another computer and another logical volume which are not using the I/O path containing the resource in which the event occurs; a migration destination determining unit implemented through executing a corresponding program by a processor of the management computer, the migration destination determining unit that determines, when the performance dependence relation determining unit determines that there is the other I/O path, whether or not a performance of a resource contained in the other I/O path is retained within a preset range of a threshold requirement in the case of migrating the computer and the logical volume to the other I/O path, based on information representing the performance of the resource contained in the other I/O path; and determines the other I/O path as a migration destination of the computer and the logical volume upon determination that the performance of the resource is retained within the range of the threshold requirement.

Other problems and solutions to be disclosed in this specification will be more apparent through the description of the embodiments with reference to the accompanying drawings.

According to the present invention, it is possible to perform migration management of a computer or a logical volume in the case of performance degradation of a computer system, while considering the performance of any one of or both of an I/O path from the computer to the logical volume of a storage system, and a memory device in the storage system.

BRIEF DESCRIPTION OF THE DRAWINGS

FIG. 5 is a view showing an example of a configuration information table 11151 of the computer system 1 to be stored in a repository retained by the management server 11000 according to the first embodiment of the present invention;

FIG. 6A is a view showing an example of a performance information table 11152 of the computer system 1 to be stored in the repository retained by the management server 11000 according to the first embodiment of the present invention;

FIG. 6B is a view showing an example of a performance information table 11152' of the computer system 1 to be stored in the repository retained by the management server 11000 according to the first embodiment of the present invention;

FIG. 7 is a view showing an example of a configuration/performance history table 11153 of the computer system 1 to be stored in the repository retained by the management server 11000 according to the first embodiment of the present invention;

FIG. 8 is a view showing an example of a reserved volume table 11154 according to the first embodiment of the present invention;

DETAILED DESCRIPTION OF THE INVENTION

Hereinbelow, preferred embodiments of the present invention will be described with reference to the accompanying drawings.

First Embodiment

Figure 1:
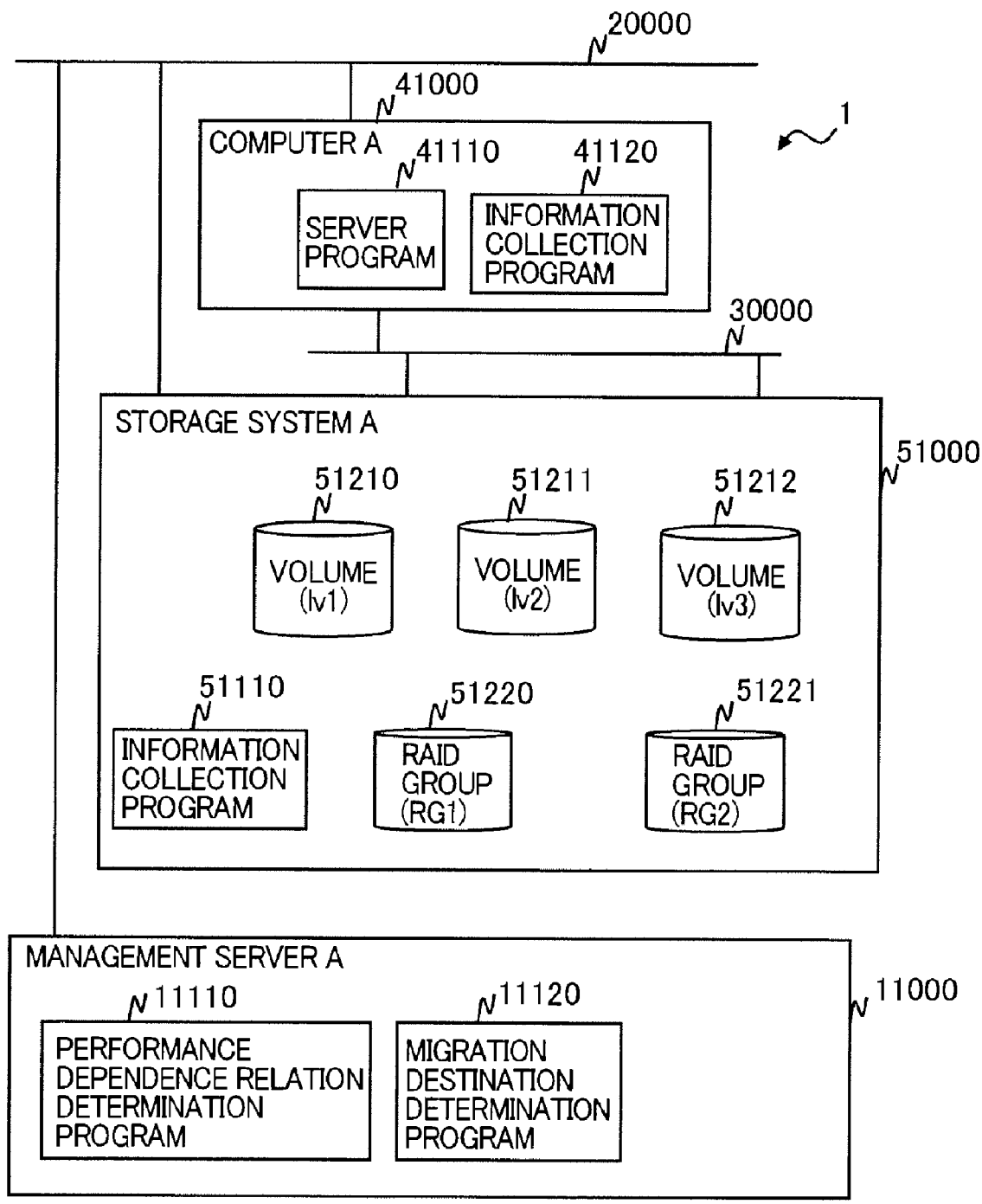
FIG. 1 is a block diagram showing a configuration example of a computer system 1 according to a first embodiment of the present invention.

First, a configuration example of a computer system 1 according to a first embodiment of the present invention will be described. FIG. 1 is a block diagram showing a configuration example of the computer system 1 including a management computer according Lo the first embodiment of the present invention.

The computer system 1 includes: a computer 41000 provided with an information collection program 41120 and a server program 41110; a storage system 51000 provided with an information collection program 51110; and a management server 11000 (a management computer) provided with a performance dependence relation determination program 11110 (a function block to be realized by executing this program is referred to as a "performance dependence relation determining unit") and a migration destination determination program 11120 (a function block to be realized by executing this program is referred to as a "migration destination determining unit"). In this embodiment, the information collection programs 41120 and 51110 to be provided in the computer 41000 and the storage system 51000 are respectively retained inside the computer 41000 and the storage system 51000. However, it is also possible to provide an information collection server to load these programs or to locate and operate these programs in the management server 11000.

As illustrated in the drawing, in the computer system 1 of this embodiment, the single computer 41000 (a computer A) and the single storage system (a storage system A) are coupled to each other through a Fibre Channel network 30000, yet it is also possible to provide two or more computers or storage systems herein.

In FIG. 1, the storage system A (51000) provides the computer A (41000) with a logical volume formed of a redundant array of independent disks (RAID) group 51220 (RG1) as a volume 51210 (volume v1) and as a volume 51211 (a volume v2), and with a logical volume formed of a RAID group 51221 (RG2) as a volume 51212 (volume v3). Although, in here, the logical volumes are offered by the RAID groups 51220 and 51221, it is also possible to adopt a configuration to offer each of the logical volumes in the form of a stand-alone physical disk. Note that, hereinafter, the simple description of the "volume" will be regarded as the "logical volume" unless otherwise defined.

Concerning a mode of coupling between the computer A (41000) and the storage system A (51000), a coupling mode through one or more network devices such as Fibre Channel switches may be adopted, instead of direct coupling using the Fibre Channel network 30000 as shown in FIG. 1. Moreover, although the Fibre Channel network 30000 is used for the coupling between the computer A (41000) and the storage system A (51000) in this embodiment, a network of a different type may be used as long as it is a data communication network. For instance, an Internet protocol (IP) network may be adopted.

The management server A (11000) is coupled to the computer A (41000) and the storage system A (51000) through a management network 20000 and is configured to communicate with function blocks defined by the information collection programs 41120 and 51110 in the respective devices. A performance dependence relation determination process is conducted by executing the performance dependence relation determination program 11110. A migration destination determination process is conducted based on the performance relation judged by the performance dependence relation determination program 11110, reserved volume information, and a configuration/performance history, by executing the migration destination determination program 11120.

Figure 2:
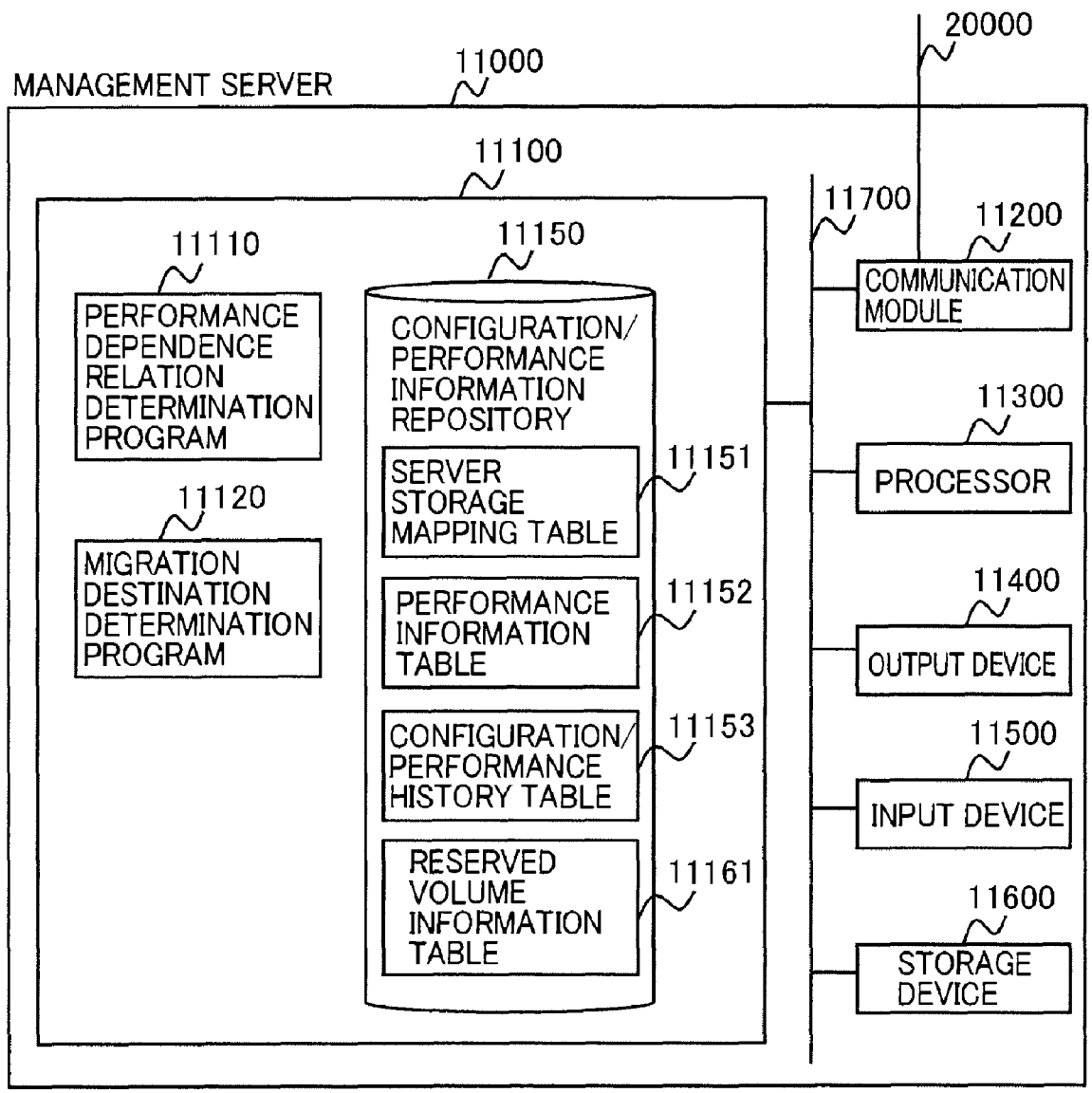
FIG. 2 is a block diagram showing a configuration example of a management server 11000 according to the first embodiment of the present invention.

Next, the management server 11000 is described. FIG. 2 is a block diagram showing a configuration example of the management server 11000.

The management server 11000 includes a memory 11100, a communication module 11200 for coupling to the management network 20000, a processor 11300, an output device 11400 such as a display device for outputting an execution result of a migration control process by the migration destination determination program 11120 and the like, an input device 11500 such as a keyboard for allowing an administrator to input instructions, and a storage device 11600. These constituents are coupled to one another through a communication path 11700 such as an internal bus.

The memory 11100 stores the programs to be executed by the management server, namely, the performance dependence relation determination program 11110, the migration destination determination program 11120, and a configuration/ performance information repository 11150 which is a region for storing configuration/performance information collected from the information collection programs 41120 and 51110 for respectively managing the computer 41000 and the storage system 51000 in the computer system 1.

The configuration/performance information repository 11150 stores: a server storage mapping table 11151 for retaining a correspondence between the information pieces on the computer 41000 and the server program 41110 (an OS, operating applications) operating thereon, and the volumes mounted inside the computer 41000; a performance information table 11152 for retaining performance information on devices included in the computer system 1 and resources held by the devices; a configuration/performance history table 11153 for associating the information between the server storage mapping table 11151 and the performance information table 11152 and retaining it in accordance with a temporal axis; and a reserved volume information table 11154 for retaining information indicating server program 41110 (OS, operating applications) has previously utilized a volume that has not been not used by any computer 41000.

The processor 11300 reads and executes programs stored in the memory 11100, and also references the respective tables stored in the memory 11100, as well as performs updating processes thereof.

This embodiment is based on the assumption that a server migration program 11130 is stored in the memory 11100 in the management server 11000. However, the server migration program 11130 may also be operated inside a memory 41100 of the computer 41000 or on another computer, for example. Moreover, although the rest of the above-mentioned respective programs and tables are assumed to be stored in the memory 11100, these respective programs and tables may also be stored in the storage device 11600 or in another storage medium, and then be read out to the memory 11100 and processed by the processor 11300, upon execution. Alternatively, the programs and the tables may be retained in the storage system 51000, in the computer 41000, or on another computer.

Figure 3:
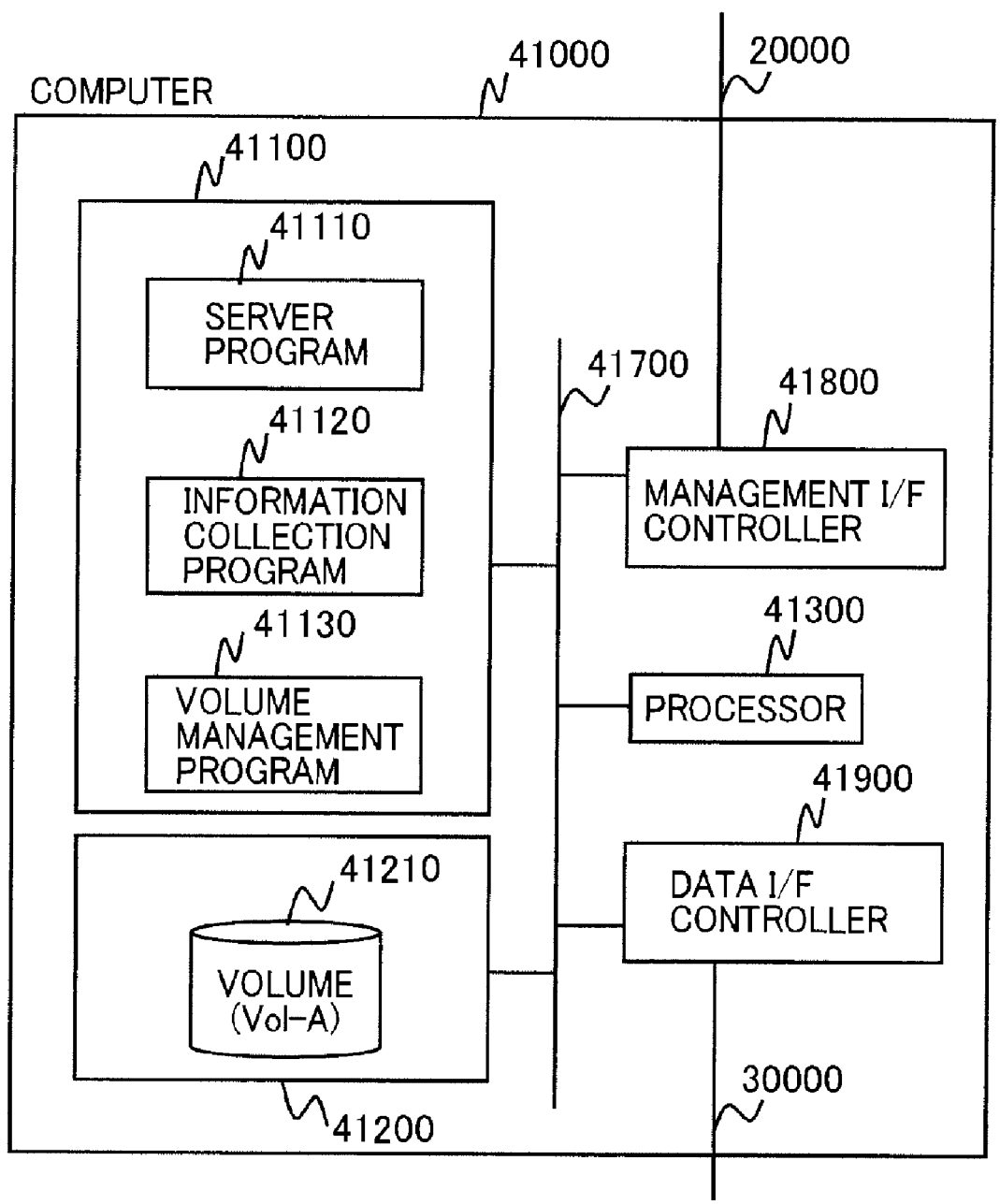
FIG. 3 is a block diagram showing a configuration example of a computer 41000 according to the first embodiment of the present invention.

Next, the computer 41000 is described. FIG. 3 is a block diagram showing a configuration example of the computer 41000.

The computer 41000 includes a memory 41100, a storage device 41200, a processor 41300, a management interface (I/F) controller 41800 for coupling to the management network 20000, and at least one data I/F controller 41900 for coupling to the Fibre Channel network 30000. These constituents are mutually coupled through a communication path 41700 such as an internal bus.

The memory 41100 stores a server program 41110 representing the OS and an operating application on the OS, an information collection program 41120 which is a program for communicating the management server 11000 to transmit and receive the management and performance information on the management server 11000, and a volume management program 41130 which is a program for mounting a volume disclosed by the storage system 51000 into the management server 11000.

The volume management program 41300 mounts a virtual volume, which is supplied from the storage system 51000 to the computer system 1, on a volume inside the storage device 11600 in the management server 11000, and thereby a business program on the computer 41000 can use a volume in the storage system 51000.

Here, this embodiment is provided with the single computer 41000 and the single data I/F controller 41900 provided therein. However, the number of the computers 41000 and the number of the data I/F controllers 41900 may be more than one. Meanwhile, the server program 41110, the information collection program 41120, and the volume management program 41130 are assumed to be stored in the memory 41100. However, these programs may be stored in the storage device 11600 or the storage medium, and be read out and loaded on the memory 41100 by the processor 41300, upon execution. Alternatively, the programs may be retained on a different server, in the storage system 51000 or in the server.

Figure 4:
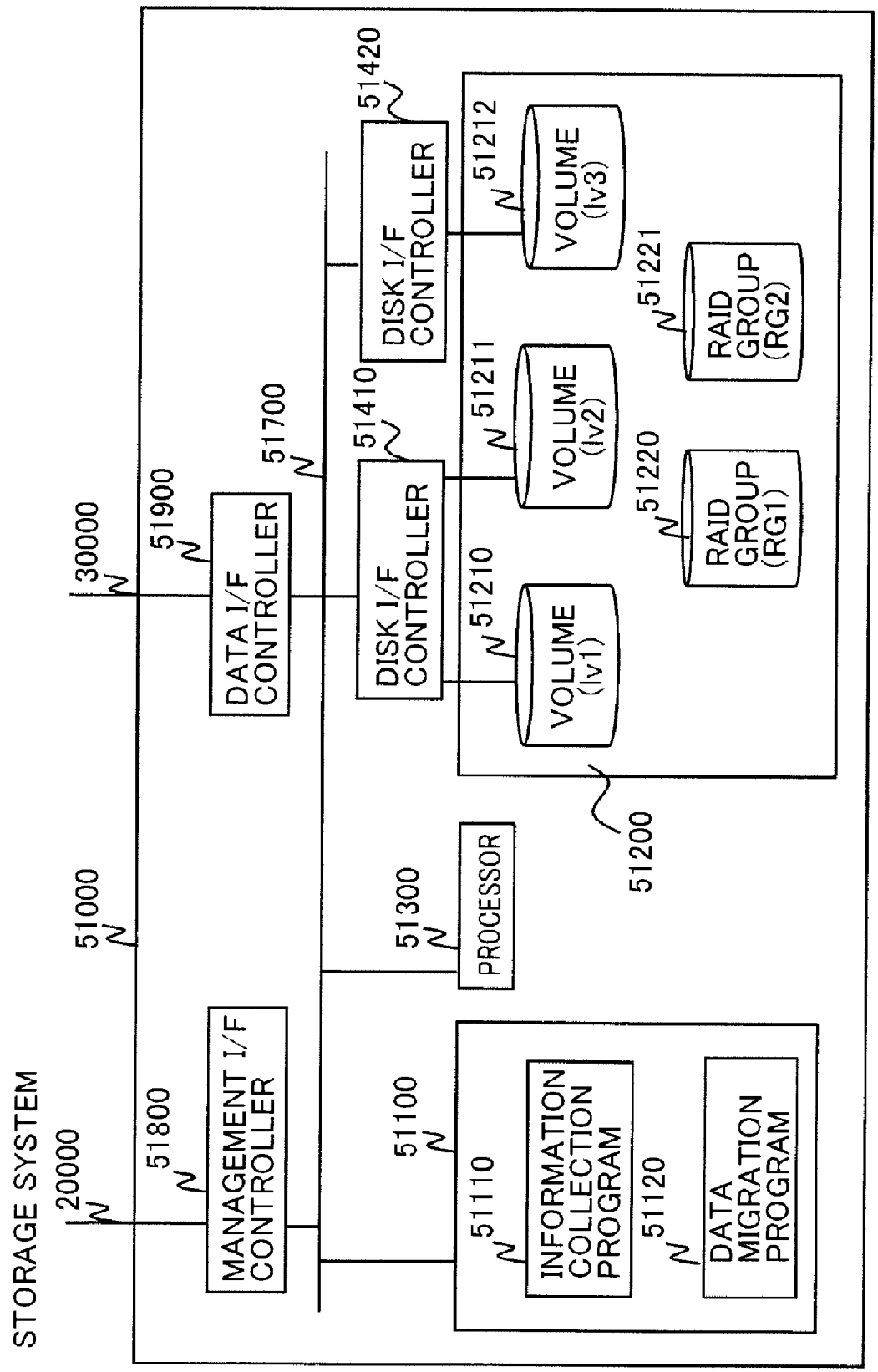
FIG. 4 is a block diagram showing a configuration example of a storage system 51000 according to the first embodiment of the present invention.

Next, the storage system 51000 is described. FIG. 4 is a block diagram showing a configuration example of the storage system 51000.

The storage system 51000 includes a memory 51100, a volume provider 51200 for providing a data storage area, a processor 51300, disk I/F controllers 51410 and 51420, a management I/F controller 51800 for coupling to the management network 20000, and a data I/F controller 51900 for coupling to the Fibre Channel network 30000. These constituents are mutually coupled though a communication path 51700 such as an internal bus.

The memory 51100 stores an information collection program 51110 which is a program for communicating with the management server 11000 to transmit and receive the management and performance information on the storage system 51000, and a data migration program 51120 for performing data migration in a physical area.

The provision of partial areas, i.e. logical volumes out of PAID groups 51220 and 51221 formed of multiple physical disks allows the volume provider 51200 to access from outside the storage system 51000 to the physical area. Here, the single storage system 51000 with the single data I/F controller and two disk I/F controllers included therein is provided. However, the number of the storage systems 51000, the data I/F controllers, and the number of the disk I/F controllers may be any number.

Meanwhile, the information collection program 51110 is assumed to be stored in the memory 51100. However, the information collection program 51110 may be stored in another storage device or another storage medium, and then read out and loaded on the memory 51100 by the processor 51300, upon execution. Alternatively, the information collection program 51110 may also be retained in the storage system 51000, in the server, or on a different server.

Next, the tables to be used in this embodiment will be each described sequentially. First, the server storage mapping table 11151 is described. FIG. 5 is a view showing an example of the server storage mapping table 11151 to be stored in the configuration/performance information repository 11150 retained by the management server 11000.

This table stores correlation as to which volumes on respective servers correspond to which logical volumes 51210, 51211 and 51212, and RAID groups 51220 and 51221 through which data I/F controllers 51900 of the storage system 51000. A record is added to the server storage mapping table 11151 by executing the performance dependence relation determination program 11110.

A unique identification value for the computer 41000 is registered in a computer name entry 11151A of the server storage mapping table 11151. A unique identification value for the volume inside the server is registered in a volume number entry 11151B. A unique identification value for the storage system 51000 used by the volume in the volume number entry 11151B is registered in a storage name entry 11151C.

A unique identification value for the data I/F used by the volume in the volume number entry 11151B is registered in a data I/F number entry 11151D. A unique identification value for any one of the logical volumes 51210 to 51212 in the storage system 51000 uniquely identified in the storage name entry 11151C is registered in a logical volume number entry 11151E.

A unique identification value for any one of the RAID groups 51220 and 51221 in the storage system 51000 uniquely identified in the storage name entry 11151C is registered in a RAID group number entry 11151F.

Next, the performance information table 11152 is described. FIG. 6A is a view showing an example of a performance information table 11152 concerning the logical volumes 51210 to 51212, which are stored in the configuration/performance information repository 11150 retained by the management server 11000, while FIG. 6B is a view showing an example of a performance information table 11152' concerning the RAID groups 51220 and 51221.

These tables store the performance information on the volumes on the respective servers, the logical volumes 51210 to 51212 in the respective storage systems 51000, the PAID groups 51220 and 51221 in the respective storage systems 51000, and so forth. A record is added to the performance information tables 11152 and 11152' by executing the performance dependence relation determination program 11110.

The performance information table 11152 stores the information concerning the logical volumes 51210 to 51212, and a unique identification value for the storage system 51000 is registered in a storage name entry 11152A thereof. A unique identification value for any one of the logical volumes 51210 to 51212 in the storage system 51000 uniquely identified in the storage name entry 11152A is registered in a logical volume number entry 11152B.

An average value of I/O response time for any one of the logical volumes 51210 to 51212 is registered in an I/O Response Time entry 11152C. An I/O amount per unit time (the number of I/O processed every second) of any one of the logical volumes 51210 to 51212 is registered in an IOPS (I/O Per Second) entry. An I/O transfer rate per unit time from any one of the logical volumes 51210 to 51212 is registered in an I/O transfer rate entry 11152E.

Meanwhile, another example of the performance information table is shown as 11152'. The performance information table 11152' stores the information concerning the PAID groups 51220 and 51221, and a unique identification value for the storage system 51000 is registered in a storage name entry 11152F thereof. A unique identification value for any one of the RAID groups 51220 and 51221 is registered in a RAID group number entry 11152G. I/O response time for any one of the PAID groups 51220 and 51221 is registered in an I/O response time entry 11152H. An I/O amount per unit time for any one of the RAID groups 51220 and 51221 is registered in an IOPS entry 11152I. An I/O transfer rate per unit time from any one of the RAID groups 51220 and 51221 is registered in an I/O transfer rate entry 11152J.

As described above, in this embodiment, the respective values of the I/O response time, the I/O per second, and the I/O transfer rate are cited as examples of the performance information. However, read and write performances may be retained separately as defined in read I/O response time, write I/O response time, or other performance indices.

Next, the configuration/performance history table 11153 is described. FIG. 7 shows an example of the configuration/performance history table 11153 to be stored in the configuration/performance information repository 11150 retained by the management server 11000. Although the table is divided into two rows in FIG. 7 due to the convenience of illustration, it should be noted that the two rows collectively constitute the single configuration/performance history table 11153.

This table stores histories of the configuration information (the OS and the type of application) and of the performance information of the computer system 1. A record is added to the configuration/performance history table 11153 by executing the performance dependence relation determination program 11110.

A value indicating time of the acquisition of the information that is retained in the corresponding devices is registered in a time stamp entry 11153A of the configuration/performance history table 11153, by the communication between a function block realized by the information collection program in the management server 11000 and a function block realized by the information collection program in each of the devices. A unique identification value for the server program 41110 including the OS and the operating application thereon is registered in a server program entry 11153B.

A unique identification value for the computer 41000 is registered in a computer name entry 11153C. A unique identification value for the volume in the server is registered in a volume number entry 11153D. Information on which server program (the OS) has been utilized is registered in an OS entry 11153E. Here, the OS is specified by a product name such as WinXP or Solaris®, but the information here is not limited only to the foregoing.

Information as to which server program (the operating application) has been utilized is registered in an APP entry 11153F. Here, the application is specified by a product name such as Oracle, for instance. Information on the degree of the IOPS used for operation is registered in an IOPS entry 11153G. A larger IOPS value represents a higher I/O processing capacity to be required.

Meanwhile, a unique identification value for the storage system 51000 used by the volume in the volume number entry 11153D is registered in a storage name entry 11153H. A unique identification value for the data I/F used by the volume stored in the volume number entry 11153D is registered in a data I/F number entry 11153I. A unique identification value for any one of the logical volumes 51210 to 51212 in the storage system 51000 uniquely identified by the value recorded in the storage name entry 11153H is registered in a logical volume number entry 11153J.

An average value of I/O response time for any one of the logical volumes 51210 to 51212 is registered in an I/O Response Time entry 11153K. A unique identification value for any one of the RAID groups 51220 and 51221 in the storage system 51000 uniquely identified by the value recorded in the storage name entry 11153H is registered in a RAID group number entry 11153L. An I/O amount per unit time for any one of the RAID groups 51220 and 51221 is registered in an TOPS entry 11153M.

Next, the reserved volume table 11154 to be stored in the configuration/performance information repository 11150 retained by the management server 11000 will be described. FIG. 8 shows an example of the reserved volume table 11154. This table shows information on a volume in a migration source which is no longer used and is left over after migration of volume stored data is executed. A record is added to the reserve volume table 11154 by executing a migration destination determination program 11120 which is described later.

Information as to which server application (the OS) previously utilized the reserved volume is registered in an OS entry 11154A of the reserved volume table 11154. Here, the information is specified by a product name such as WinXP or Solaris® for instance.

Information as to which server application (the operating application) previously utilized the reserved volume is registered in an APP entry 11154B. The information herein is specified by a product name or the type of application such as Oracle® or numerical calculation.

A unique identification value for the storage system 51000 retaining the reserved volume is registered in a storage name entry 11154C. A unique identification value for any one of the logical volumes 51210 to 51212 in the storage system 51000 uniquely identified by the value recorded in the storage name entry 11154C is registered in a logical volume number entry 11154D.

A unique identification value for any one of the RAID groups 51220 and 51221 in the storage system 51000 uniquely identified by the value recorded in the storage name entry 11153C is registered in a RAID group number entry 11154E.

Figure 9:
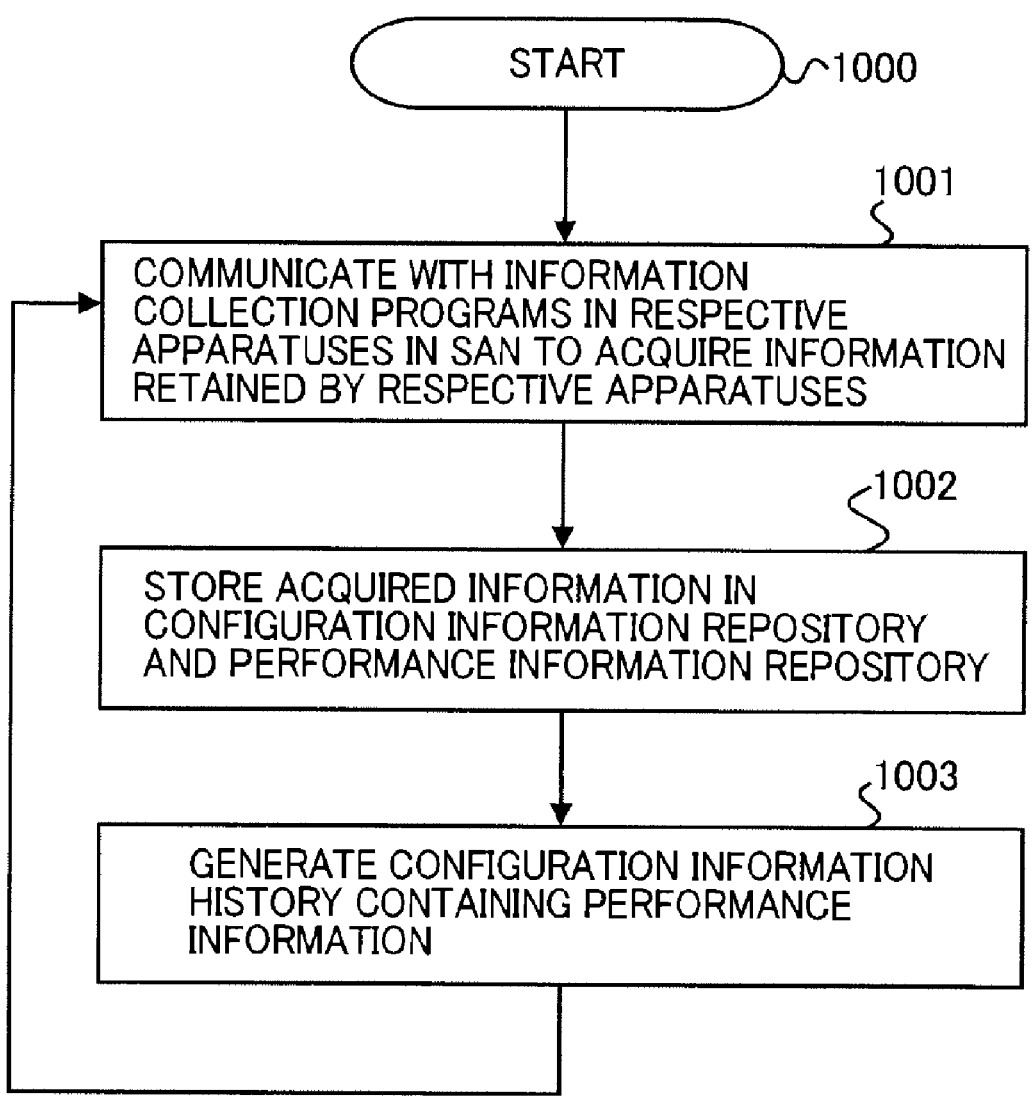
FIG. 9 is a flowchart showing an example of a table generating process by a performance dependence relation determination program 11110 according to the first embodiment of the present invention.

Next, a table generation process to be realized by execution of the performance dependence relation determination program 11110 on the management server 11000 will be described. FIG. 9 shows a flowchart 1000 representing the table generating process to be executed by the processor 11300 that reads out the performance dependence relation determination program 11110.

This process is periodically carried out when the processor 11300 of the management server 11000 executes the performance dependence relation determination program 11110 stored in the memory 11100. Accordingly, a table for specifying the most recent configuration information and the I/O performance information in a storage area network (SAN) environment and a table indicating the histories of the configuration/performance information in the SAN environment are generated. Unless otherwise specified, each of the following steps to he described below is performed by the processor 11300 on the management server 11000.

The processor 11300 acquires the configuration/performance information pieces retained by the respective devices through a communication with the function blocks that are realized by the information collection programs on the respective devices such as the information collection program 41120 in the computer 41000 (Step 1001). In this case, particularly, it is ideal to perform a real-time monitoring of the performance information. For instance, the processor 11300 may be set to acquire the information every minute.

Next, the processor 11300 stores the acquired configuration information and the performance information in the server storage mapping table and the performance information table in the configuration/performance information repository (Step 1002).

Then, the processor 11300 uses the stored information in Step 1002 to generate the configuration/performance history table formed of a configuration information history including the performance information (Step 1003).

In this embodiment, a timing to acquire the configuration information through the information collection programs in the respective devices by executing the performance dependence relation determination program 11110 and to store the configuration information in the server storage mapping table inside the configuration information repository, is set same as a timing to acquire the performance information through the information collection programs in the respective devices by executing the performance dependence relation determination program 11110 and to store the performance information in the performance information table in the performance information repository. However, these processes may be carried out at mutually different timings.

Moreover, a timing to merge the performance dependence relation with the configuration information to generate the history information is set same as a timing to acquire the configuration/performance information. However, Step 1003 may be performed by monitoring a change in the performance value by executing the information collection program 51110 in the storage system 51000 and notifying the performance dependence relation determination program 11110 of the change on a timely basis, for example.

In Step 1001 for acquiring the information retained by the respective devices, the processor 11300 collects the respective pieces of information which are collected by executing the information collection programs operated on the respective devices.

The information collection program 51110 may acquire correlations among the server name, the volume number in the server, the name of the storage system at a coupling destination, the data I/F number at the coupling destination, the logical volume number included in the storage system 51000 at the coupling destination, and the RAID group 51220 or 51221 included in the storage system 51000 at the coupling destination, by any means. For instance, a SCSI inquiry may be issued from the server to each of the logical volumes 51210 to 51212 so as to acquire the information from the storage system 51000.

The function block defined by the information collection program 41120 on the server 41000 may acquire the performance information on the server by any means, a request to the OS, for example. Further, the function block defined by the information collection program 51110 on the storage system 51000 may acquire the performance information on the storage by any means, by acquisition of the information from the memory in which the performance information is accumulated, for example.

Next, in Step 1002 for generating the server storage mapping table 11151 and the performance information table 11152, the processor 11130 generates a new entry on each table and registers the information collected in Step 1001 respectively in the newly generated entries. Then, in Step 1003 for generating the configuration/performance information table 11153, the processor 11300 generates new entries on the configuration/performance information table, acquires the information about the entries registered in Step 1002, and registers the information respectively in the newly generated entries.

Figure 10:
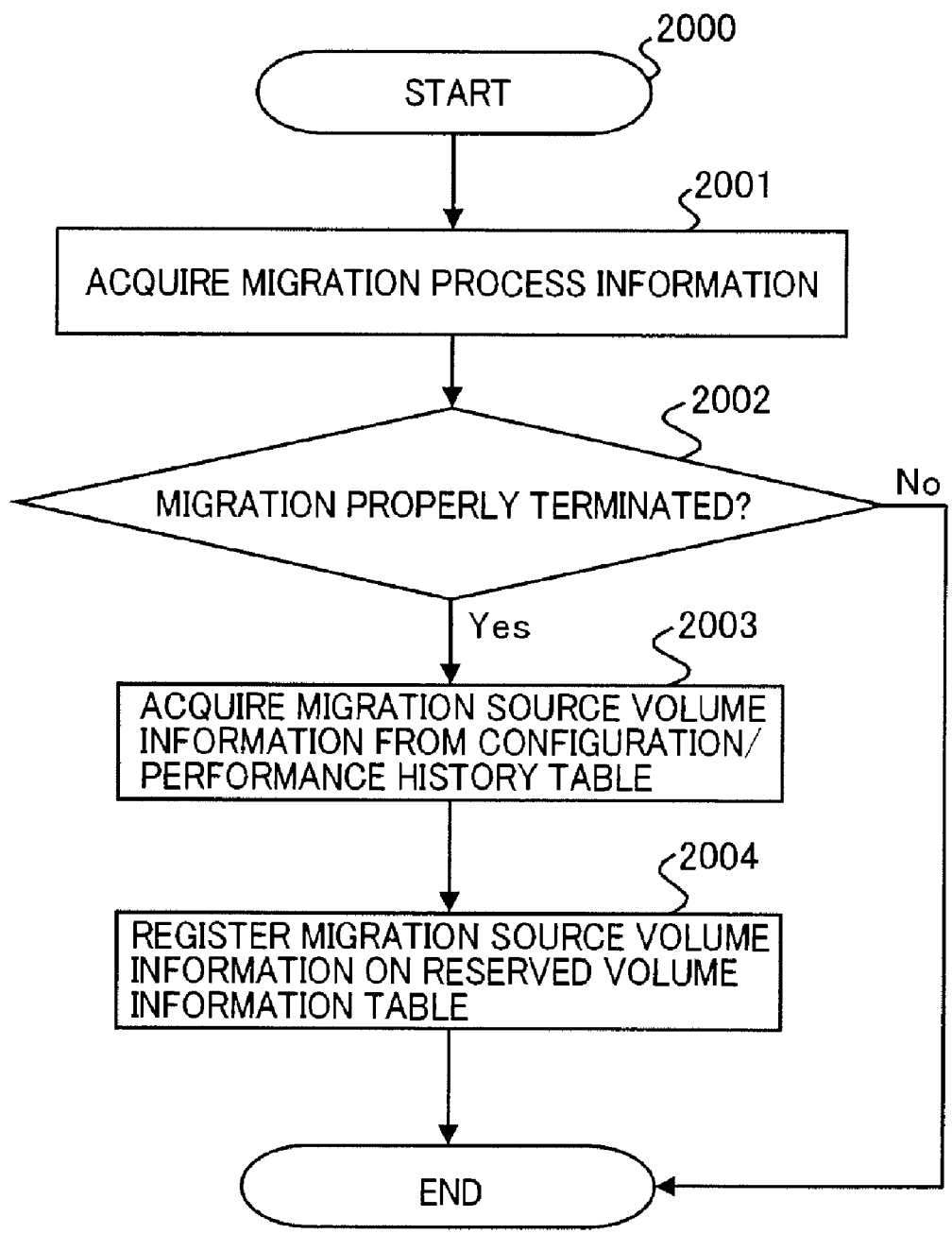
FIG. 10 is a flowchart showing an example of a reserved volume information table generating process by a migration destination determination program 11120 according to the first embodiment of the present invention.

Next, the table generating process to be realized by execution of the migration destination determination program 11120 on the management server 11000 will be described. FIG. 10 shows a flowchart 2000 representing the table generating process to be executed by the processor 11300 that reads out the migration destination determination program 11120.

This process is carried out when the processor 11300 of the management server 11000 executes the migration destination determination program 11120 stored in the memory 11100. This process is executed after performing a data migration process and is configured to register a volume, which is not provided as a normal writable volume, in the reserved volume table 11154. Unless otherwise specified, each of the following steps is carried out by the processor 11300 on the management server 11000.

First, the processor 11300 communicates with the function block defined by the information collection program 51110 in the storage system 51000 so as to collect migration process information defined by the data migration program 51120 (Step 2001).

A conformation is made to determine whether or not the data migration is normally terminated (Step 2002). If the data migration is normally terminated, the processor 11300 acquires, from the configuration/performance history table 11153, the information on the storage of the migration source, the logical volumes 51210 to 51212, and the RAID groups 51220 and 51221, as well as the information on the OS and the applications having the histories of being used in the logical volumes (Step 2003).

Lastly, the information acquired in Step 2003 is registered in the reserved volume table 11154 as the volume not provided as the usable volume for the computer 41000 (Step 2004).

Figure 11:
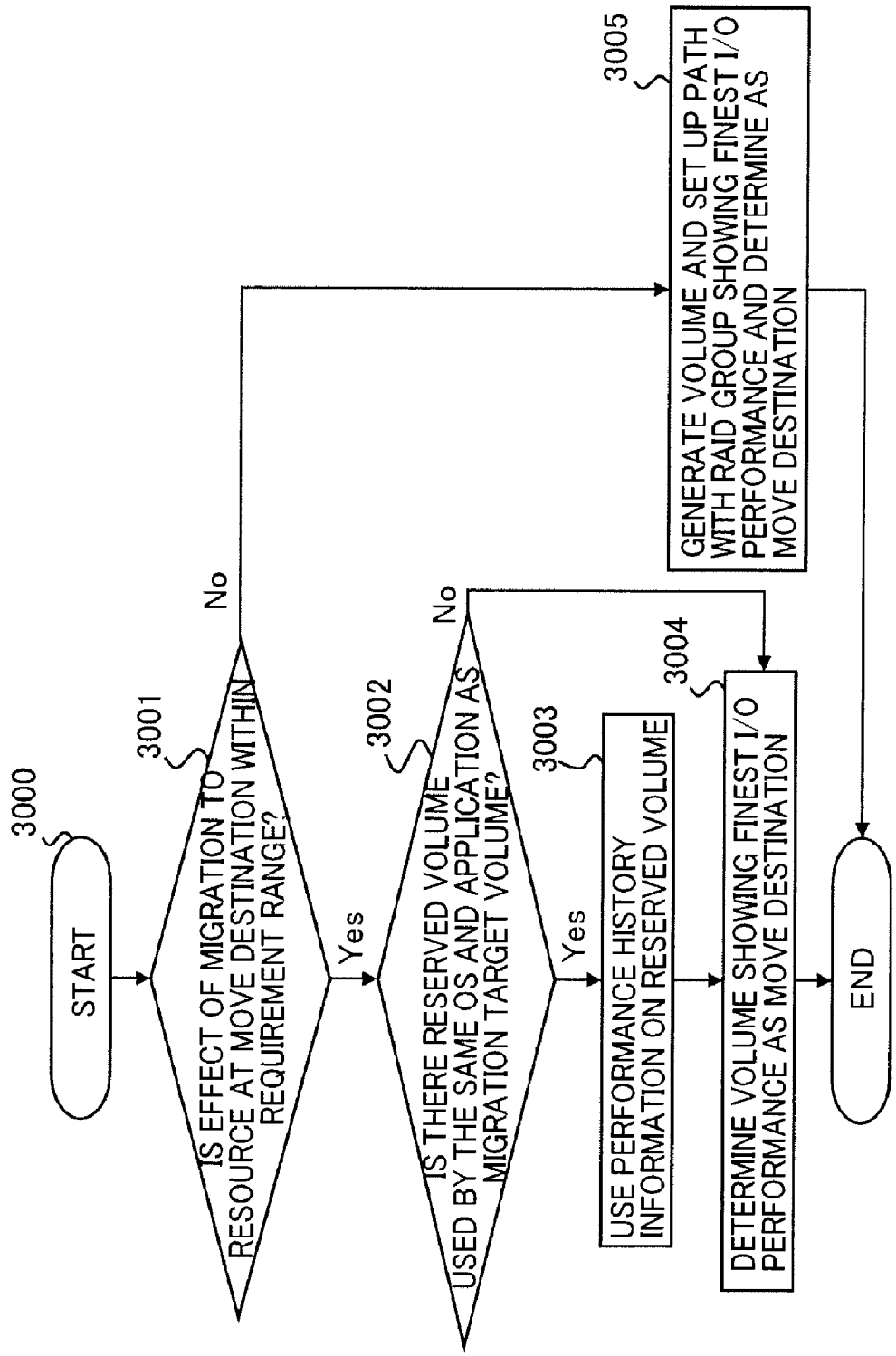
FIG. 11 is a flowchart showing an example of a migration destination determination process by the migration destination determination program 11120 according to the first embodiment of the present invention.

Next, the migration destination determination process to be realized by executing the migration destination determination program 11120 on the management server 11000 will be described. FIG. 11 shows a flowchart 3000 representing the migration destination determination process to be executed by the processor 11330 that reads out the migration destination determination program 11120.

This process is carried out by the processor 11300 of the management server 11000 executing the migration destination determination program 11120 stored in the memory 11100. Unless otherwise specified, each of the following steps is carried out by the processor 11300 on the management server 11000.

This process is executed upon occurrence of a predetermined event that triggers logical volume migration to be performed in the computer system 1, and thereby a migration destination is determined and migration to the determined migration destination is instructed. The event triggering the migration may conceivably include performance degradation of or occurrence of a failure in resources, but any event may be adopted as the trigger for executing the migration.

First, the processor 11300 makes reference to the configuration information on the server storage mapping table and the performance information on the performance information table collected by the information collection programs in the respective devices, and confirms whether or not an effect to a resource at the migration destination remains within a range of a threshold requirement. To be more precise, the processor 11300 confirms whether or not a capacity of an array group at the migration destination causes a deficit after the migration, and whether or not the performance of the resource at the migration destination (such as the IOPS of a port or the IOPS of the RAID group) satisfies a performance threshold condition after the migration (Step 3001).

Next, by using the reserved volume table 11154, the processor 11300 confirms the presence of a reserved volume having a history of being operated by the server program (the OS, the operating application) used in the server that utilizes a target volume for migration (Step 3002).

If there is a targeted reserved volume, past history information on the volume is acquired from the configuration/performance history table 11153 while using the logical volume number 11153J as a key. Thereby, the volume representing the finest performance is extracted (Step 3003). Finally, the processor 11300 determines the reserved volume that matches a condition as the migration destination (Step 3004).

If a judgment is made in Step 3002 that there is no targeted reserved volume, the volume showing the finest I/O performance out of the volumes that satisfy the condition in Step 3001 is determined as the migration destination. Meanwhile, if the effect to the resource at the migration destination according to the migration does not satisfy the condition at all candidates for the migration destination, then a volume is generated by use of the RAID group that shows the finest I/O performance and path is set (Step 3005) so as to generate a migration destination to satisfy the condition.

According to the first embodiment of the present invention described above, the migration destination is determined by use of the server program 41110 (the OS, the application) in the computer 41000 that uses the volume and the performance information in the past history. This allows migration of the volume to be carried out while considering the performance of the storage device that provides the logical volumes 51210 to 51212.

Second Embodiment

Figure 12:
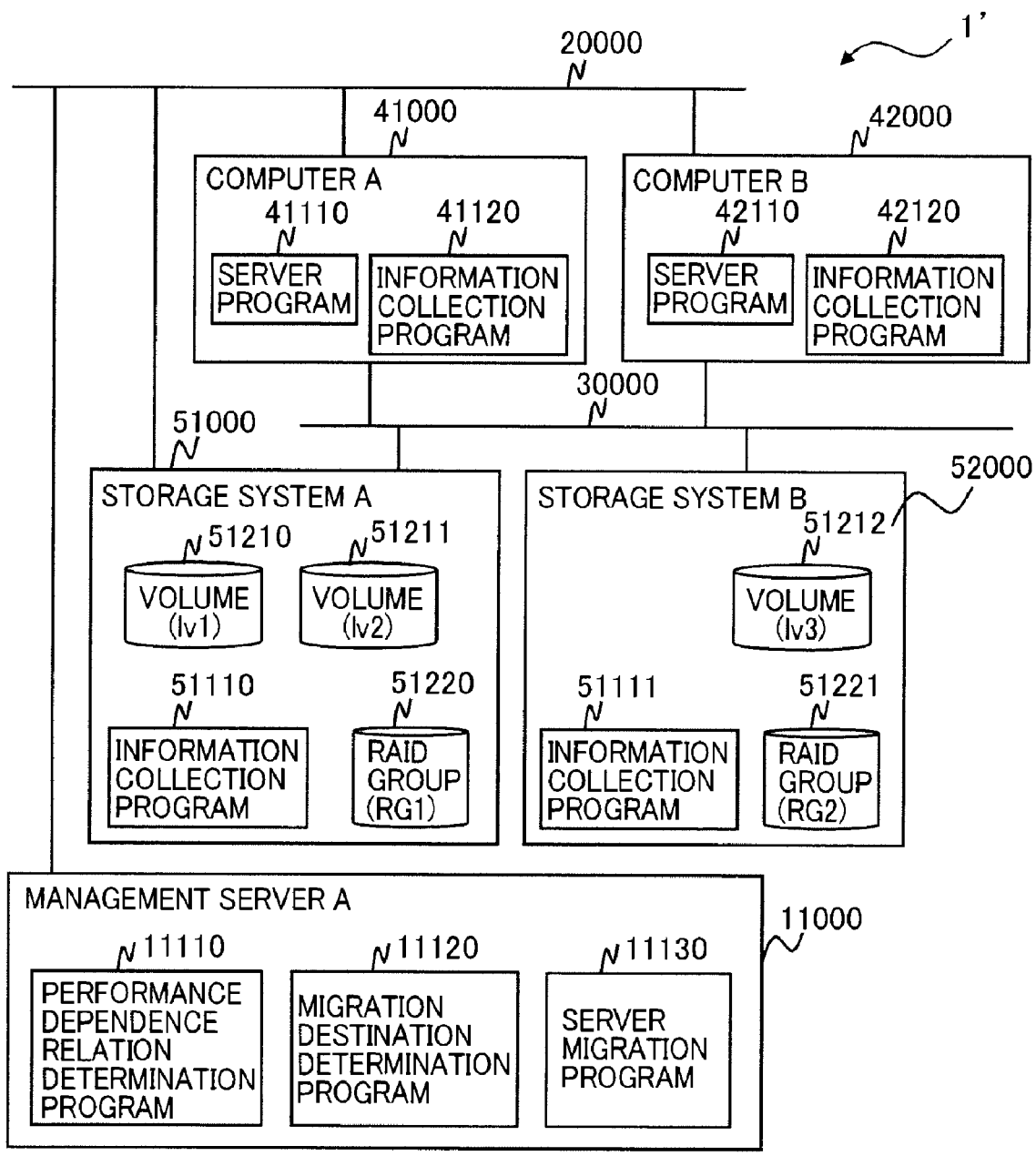
FIG. 12 is a block diagram showing a configuration example of a computer system 1' according a second embodiment of the present invention.

Next, a second embodiment of the present invention is described. In FIG. 12, an example of a block configuration diagram of a computer system 1' having a management computer according to the second embodiment is illustrated. The computer system 1' includes: one or more computers 41000 and 42000 provided respectively with information collection programs 41120 and 42120, and server programs 41110 and 42110; one or more storage systems 51000 and 52000 provided respectively with information collection programs 51110 and 51111; and at least one management server 11000 provided with a performance dependence relation determination program 11110, a migration destination determination program 11120, and a server migration program 11130.

In this embodiment, the information collection programs provided in the computer 41000 and the storage systems 51000 and 52000 are respectively retained inside the server and the storage systems 51000 and 52000. However, it is also possible to provide an information collection program server separately to implement the programs therein or to locate and operate these programs in the management server. Further, the server migration program is retained in the management server, however it is also possible to provide a server migration management server separately or to locate and operate the program in any of the computers.

In the following description of this embodiment, the computer system 1' is assumed to include two computers 41000 (a computer A) and 42000 (a computer B), two storage systems 51000 (a storage system A) and 52000 (a storage system B), each retaining a volume data migration function, and these devices are mutually coupled through a Fibre Channel network 30000. In addition, each of the server programs 41110 and 42110 on the respective computers 41000 and 42000 is assumed to have a server migration mechanism.

As illustrated in FIG. 12, the storage system A (51000) provides the computer A (41000) with logical volumes 51210 to 51212 formed of a RAID group 51220 (RG1) as a volume 51210 (volume v1) and as a volume 51211 (a volume v2). Similarly, the storage system B (52000) provides the computer B (42000) with logical volumes 51210 to 51212 formed of a RAID group 51221 (RG2) as a volume 51212 (volume v3).

Note that, concerning a mode of coupling among the computer A (41000), the computer B (42000), the storage system A (51000), and the storage system B (52000), it is also possible to adopt a mode of coupling through one or more network devices such as Fibre Channel switches, instead of direct coupling using the Fibre Channel network 30000, as shown in FIG. 12. Moreover, in this embodiment, the Fibre Channel network 30000 is used for the coupling among the computers A (41000) and B (42000), and the storage systems A (51000) and B (52000). However, a network of a different type may also be used, as long as it is a data communication network. For instance, an Internet protocol (IP) network may be used.

The management server A (11000) is coupled to the computer A (41000), the computer B (42000), the storage system A (51000), and the storage system B (52000) through a management network 20000 and communicates with function blocks defined by the information collection programs in the respective devices.

A performance dependence relation determination process is conducted by executing a performance dependence relation determination program 11110. By executing a migration destination determination program 11120, a migration destination determination process is conducted based on the performance dependence relation determined by the performance dependence relation determination program, reserved volume information, and a configuration/performance history. Migration of data stored in the logical volumes 51210 to 51212 in the storage systems 51000 and 52000 is conducted by executing a server migration program 11130.

Figure 13:
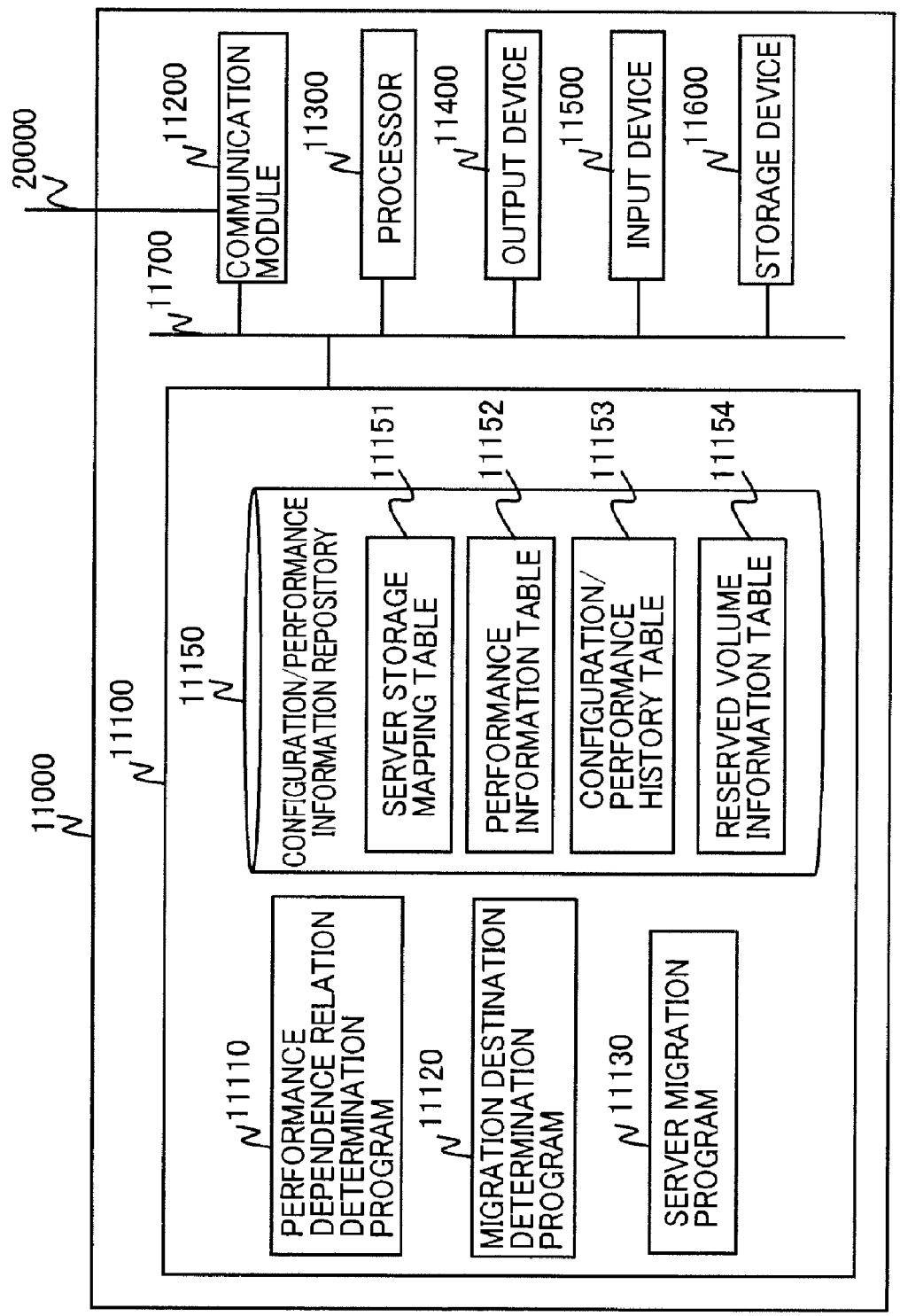
FIG. 13 is a block diagram showing a configuration example of a management server 11000 according to the second embodiment of the present invention.

Next, a management server 11000 in this embodiment will be described. FIG. 13 is a block diagram showing a configuration example of the management server 11000.

The management server 11000 includes a memory 11100, a communication module 11200 for coupling to the management network 20000, a processor 11300, an output device 11400 such as a display device for outputting an execution result of a migration control process by the migration destination determination program 11120 and the like, an input device 11500 such as a keyboard for allowing an administrator to input instructions, and a storage device 11600. These constituents are mutually coupled through a communication path 11700 such as an internal bus.

The memory 11100 stores the programs to be executed by the management server 11000, namely, the performance dependence relation determination program 11110, the migration destination determination program 11120, and the server migration program 11130, as well as a configuration/performance information repository 11150 which is a region for storing configuration/performance information collected by executing the information collection programs for managing the respective devices in the computer system 1'. Here, the provision of the server migration program 11130 is the difference from the configuration of the management server in the first embodiment.

Figure 14:
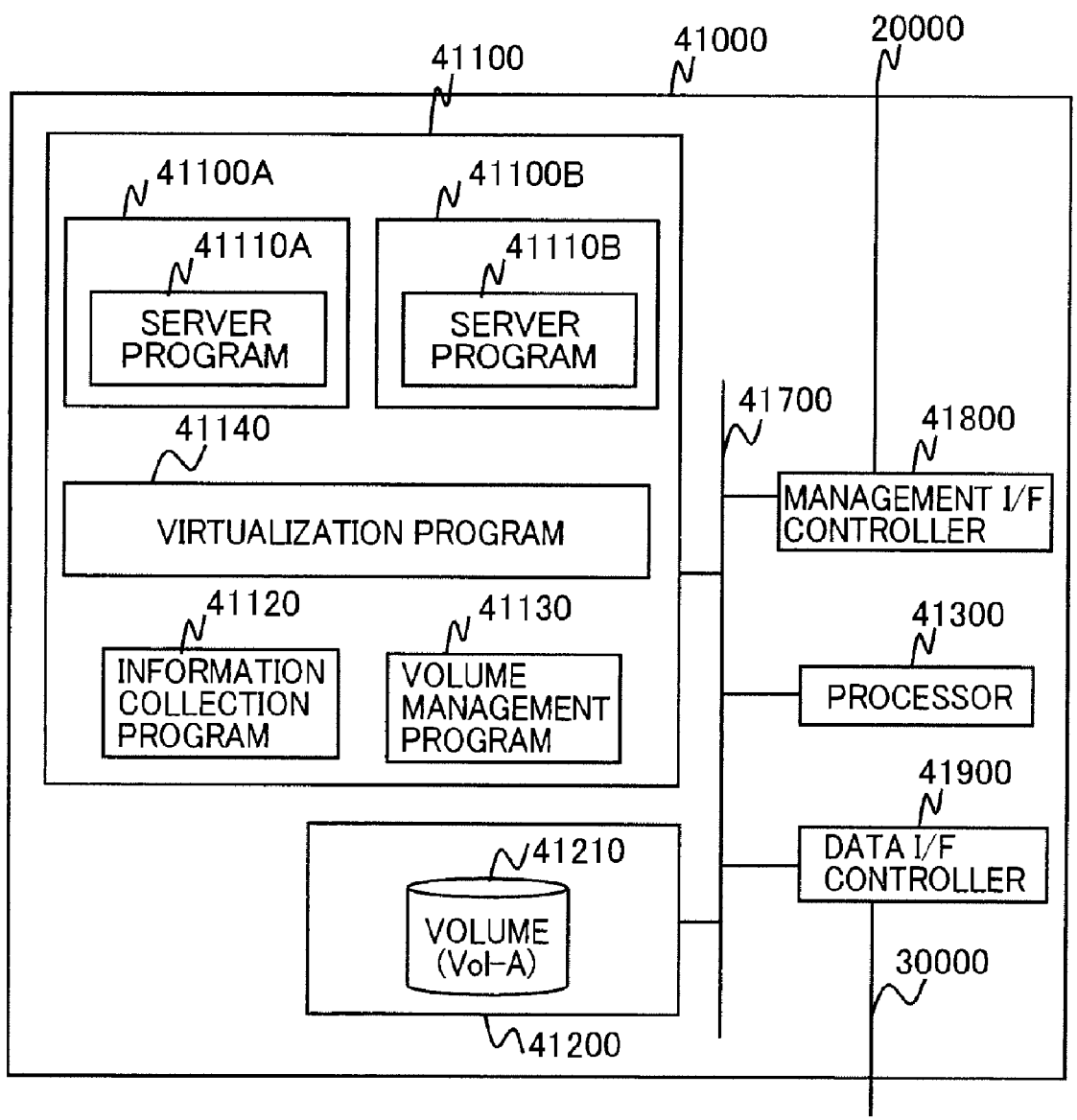
FIG. 14 is a block diagram showing a configuration example of computers 41000 and 42000 according to the second embodiment of the present invention.

Next, the computer 41000 in this embodiment will be described. FIG. 14 is a block diagram showing a configuration example of the computer 41000.

The computer 41000 includes a memory 41100, a storage device 41200, a processor 41300, a management I/F controller 41800 for coupling to the management network 20000, and at least one data I/F controller 41900 for coupling to the Fibre Channel network 30000. These constituents are mutually and coupled through a communication path 41700 such as an internal bus.

The memory 41100 stores: virtual memories 41100A and 41100B; a virtualization software program 41140 for emulating a virtual processor and a virtual I/F controller in order to operate these virtual memories; an information collection program 41120 which is a program for communicating with the management server 11000 to transmit and receive management/performance information on the server; and a volume management program 41130 which is a program for mounting volumes, which is disclosed by the storage systems 51000 and 52000, inside the server.

The virtual memories 41100A and 41100B respectively store server programs 41110A and 41110B representing virtual computers to be operated by using resources including the virtual processors and the virtual I/F controller, which are virtualized by the virtualization software program 41140.

Here, each of the server programs 41110A and 41110B is provided with a migration mechanism, and includes the OS and applications to be operated thereon. Note that, to simplify the explanation, description and illustration will be omitted for the virtual processor and the virtual I/F controller that constitute a general configuration of a virtualization mechanism and are emulated by the virtualization software program 41140.

By executing a volume management program 42200, a virtual volume provided from the storage system 51000 (the storage system A) to the computer 41000 (the computer A) is mounted on the volume 41210 in the storage device 41200 of the computer A (41000), thereby allowing a business program on the computer A (41000) to use the volumes in the storage system A (51000).

Although this embodiment includes two computers (41000 and 42000) and one data I/F controller 41900 in each server, the number of the servers and data I/F controllers 41900 is not limited. Further, although the server programs 41110 and 42110, the information collection programs 41120 and 42120, and the volume management program 41130 are stored in the memory 41100, these programs may also be stored in another storage device or another storage medium, and be loaded onto the memory 41100 by the processor 41300 upon execution. Alternatively, it is also possible to retain these programs inside any one of the storage systems 51000 and 52000, or on or inside a different server.

The configurations of the storage systems 51000 and 52000 are the same as those in the first embodiment and therefore the description will be omitted.

Further, individual information to be stored respectively in a server storage mapping table 11151, performance information tables 11152 and 11152', configuration/performance information history table 11153, and a reserved volume table 11154 are the same as those in the first embodiment and therefore the description will be omitted.

Figure 15:
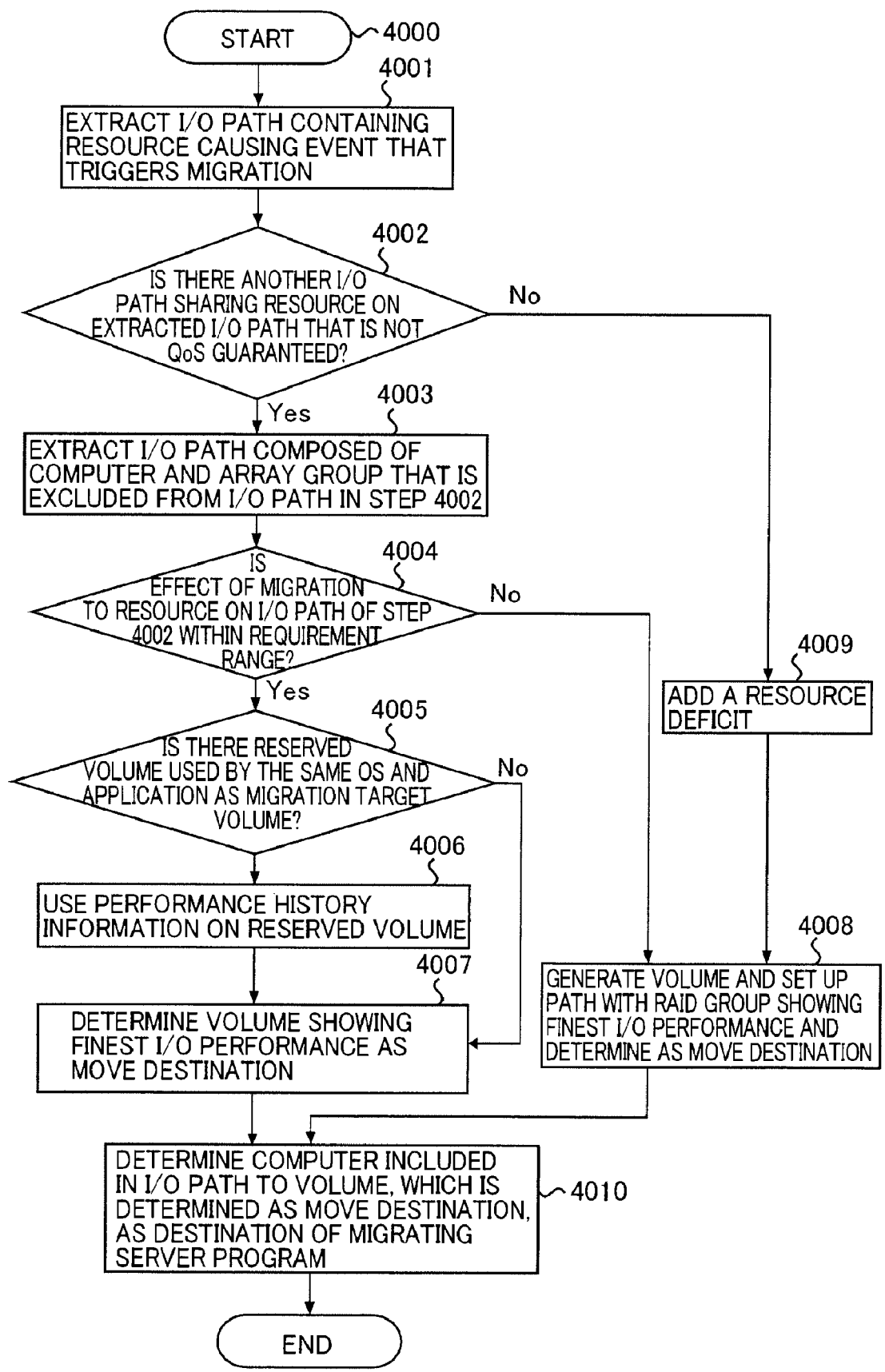
FIG. 15 is a flowchart showing an example of a migration destination determination process by a migration destination determination program 11120 according to the second embodiment of the present invention.

The processes to be executed in this embodiment are described below with reference to the accompanying drawings. The first to be described is a migration destination determination process which is to be realized by executing the migration destination determination program 11120 on the management server 11000. FIG. 15 is a flowchart illustrating a process flow of the migration destination determination process. Unless otherwise specified, each of the following steps in this process flow is executed by the processor 11300 on the management server 11000.

This process is carried out when the processor 11300 of the management server 11000 reads out and executes the migration destination determination program 11120 stored in the memory 11100. A timing of execution is when an event is occurred inside the computer system 1', the event triggering migration of any of the computers 41000 and 42000 or any of the logical volumes 51210 to 51212. It is this timing that the migration destination be determined.

The event triggering the migration may conceivably include performance degradation of resources or occurrence of a failure, but any event may be adopted. Further, it is possible to adopt any event in any resources related to an I/O path from an application utilized by a user to a physical storage area, the event including, events in any of the storage systems 51000 and 52000, in any of the computers 41000 and 42000, in a network device such as a Fibre Channel switch, in a physical network, and the like.

Here, the I/O path represents a series of paths from a physical server to a physical disk, which includes elements such as a host bus adaptor (HBA) port of a physical server, a network switch, a storage controller, the logical volumes 51210 to 51212, the RAID groups 51220 and 51221. Further, in here, the above-mentioned elements located on the I/O path will be herein collectively referred to as the resources.

The processor 11300 makes reference to the configuration information on the server storage mapping table 11151 and the performance information on the performance information tables 11152 and 11152', which are collected by the information collection programs of the respective devices included in the computer system 1', and then extracts the I/O path containing the resource that causes the event triggering the migration (Step 4001).

Next, a confirmation is made to determine whether or not there is another I/O path that shares a no quality-of-service (QoS) guaranteed resource located on the extracted I/O path (Step 4002). There may be a case where two or more I/O paths share the same resource. In this case, if a change occurs in one of the I/O paths that share the resource, the change affects the performances of other I/O paths. Such shared resource is generally referred to as "not QoS guaranteed."

For example, referring to the configuration/performance history information table 11153 in FIG. 7, the server program A (41110A) and the server program B (41110B) share a data I/F "p1," meaning that this data I/F "p1" is a resource which is not QoS guaranteed on the I/O paths of the server programs A and B (41110A and 41110B).

If there is an I/O path corresponding to Step 4002, a confirmation is made to determine whether or not there is an I/O path composed of another computer and another RAID group which are not included in the relevant I/O path (Step 4003). If there is an I/O path corresponding to Step 4003, a confirmation is made to determine whether or not an effect of the migration to the resource on the I/O path is within a range of a threshold requirement (Step 4004).

This threshold requirement is used to determine, if the migration is executed, a threshold for each of the resources in advance from the viewpoint of determining whether or not an existing application, which utilizes the I/O path including each of the resources subjected to the migration destination, is able to operate normally after the migration is executed. Such thresholds may use, for example, a storage capacity of the RAID group as the migration destination, an IPOS value of the HBA port or the RAID group which belongs to the I/O path, a CPU performance of the computer as the migration destination, a memory performance, an I/O response rate of another application operating on the computer at the migration destination, and the like.

Here, it is also possible to perform weighting according to the priorities of the resources included in the I/O path at the migration destination, to score the influence to the entire I/O path at the migration destination, and to use this score as an index for determining the appropriateness of the migration. There may be a case where the migration cannot be executed due to dissatisfaction of a predetermined threshold requirement for any one of resources, despite the fact that the I/O path falls within an allowable range if seen as a whole. However, operation of such inflexible system may not be forced and avoided, if the above-described configuration is employed.

When the influence of the migration is determined to be within the threshold requirement in Step 4004, the processor 11300 confirms, by making reference to the reserved volume table 11154, whether or not there is a reserved volume having a history of being operated by the server programs 41110 and 42110 (the OS, the operating applications) that are operating on the servers using a migration target volume (Step 4005).

Here, the reason for selecting the reserved volume having the history of being used by the server programs 41110 and 42110 that are the same as those of the migration target is that it is expected to shorten the time for the migrated server programs 41110 and 42110 to start using the reserved volume after executing the migration. For example, if the same server programs 41110 and 42110 as those of the migration target use the same Windows XP® as an OS, an effect to shorten the time required for formatting a physical disk may be obtained due to the identity of the file systems. If security problems are to be taken into consideration, it may be even possible to omit disk formatting.

When there is a target reserved volume (Yes in Step 4005), past history information is acquired from the configuration/performance history table 11153 and the volume indicating the finest performance is extracted (Step 4006). Finally, the processor 11300 determines the migration destination according to the condition (Step 4007).

If there is no reserved volume used by the same server programs 41110 and 42110 (No in Step 4005), a volume indicating the finest I/O performance among the volumes that satisfy the threshold requirement in Step 4004 is determined to be the migration destination (Step 4007).

If the influence of the migration to the resource at the migration destination does not satisfy the threshold requirements of all migration destination candidates (No in Step 4004), reference is made to the performance information table 11152' in FIG. 6B so as to form a new volume using the RAID group that indicates the finest I/O performance. Thereby, path for the I/O path is set, and consequently a migration destination that satisfies the threshold requirement is generated (Step 4008).

When it is determined in Step 4002 that there is no I/O path sharing the resource which is not QoS guaranteed (No in Step 4002), a necessary resources such as a RAID group, a storage controller or a computer is added manually, for example, by an administrator (Step 4009), and then Step 4008 is performed. Here, when it is determined that there is no I/O path sharing the resource which is not QoS guaranteed, the processor 11300 may notify the administrator as such through the display device serving as the output device 11400, for example.

Subsequently, the processor 11300 determines the computer included in the I/O path to the volume, which is determined as the migration destination, as the migration destination of the server programs 41110 and 42110 (Step 4010). Note that, the processor performance of the computer at the migration destination, the performance of the data I/F controller or an influence to a memory usage rate has been confirmed in Step 4004 for confirming the range of the threshold requirement.

Figure 16:
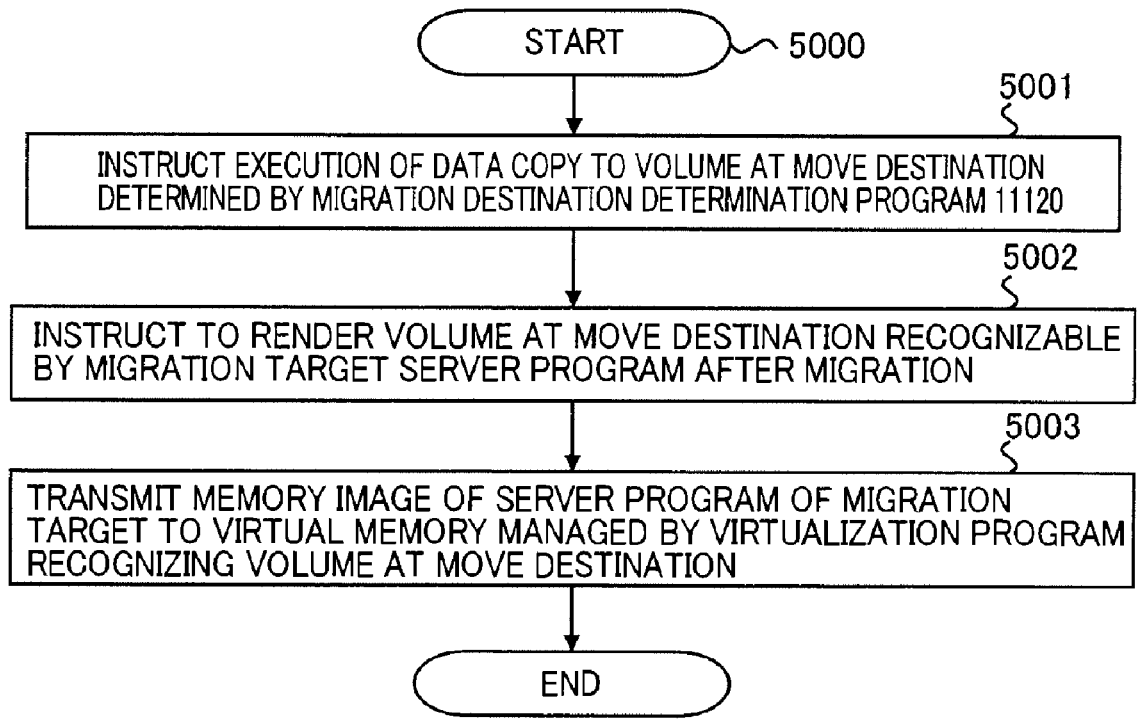
FIG. 16 is a flowchart showing an example of a migration process by the migration destination determination program 11120 according to the second embodiment of the present invention.

Next, the migration process of this embodiment, which is to be instructed by the migration destination determination program 11120 on the management server 11000 and to be realized by executing the server migration program 11130 on the management server 11000 and a data migration program 51120 on the storage device 51000 will be described. FIG. 16 is a flowchart showing a process flow of this migration process.

This process is carried out when the processor 41300 of the computer 41000 executes the server migration program 11130 stored in the memory 41100, and when the processor 51300 of the storage system 51000 executes the data migration program 51120 stored in the memory 51100. After the migration destination determination program 11120 determines the migration destination, this process is executed to perform an instruction of migration to the determined migration destination.

First, by using the migration destination determination program 11120, the management server 11000 sends an instruction to the data migration program 51120 to perform data copy to the volume at the migration destination determined by the migration destination determination program 11120 (Step 5001).

Specific procedures of the data copy are as follows. First, the data migration program 51120 issues a copy pair generation command and a copy start command in accordance with the above-described instruction. Here, the copy pair generation command contains information including a copy pair management number, a copy source volume name, and a copy destination volume name, which are necessary for the data copy. In contrast, the copy start command contains the copy pair management number which is allocated at the time of generating the copy pair.

Subsequently, along the execution of the copy start command, data in the copy source volume are transmitted to the copy destination volume, whereby written data to the copy source volume are subjected to difference management. After the data copy to the copy source volume at the time of issuing the copy start command is completed, the written data to the copy source volume subjected to the difference management are copied to the copy destination volume. When an amount of data subjected to the difference management becomes sufficiently small, the I/O to the copy source volume is temporarily set to a non-receiving state. Then all differential data are transmitted to the copy destination volume and the volume for receiving the I/O from the server programs 41110 and 42110 is switched to the copy destination volume.

Next, the migration destination determination program 11120 issues an instruction to the server migration program 11130 so that the server migration program 11130 issues an instruction to the virtualization software program 41140 to cause the server programs 41110 and 42110 to recognize the volume at the migration destination determined by the migration destination determination program 11120, so that the server programs 41110 and 42110 of the migration target can recognize the volume at the migration destination after the migration (Step 5002).

Thereafter, the migration destination determination program 11120 causes the server migration program 11130 to transmit memory images of the server programs 41110 and 42110 being the migration targets to the virtual memory managed by the virtualization software program 41140 that recognized the volume at the migration destination (Step 5003). In this case, difference management of the memory image is conducted. When the difference of the memory image becomes sufficiently small, an I/O process in the server program 41110 at the migration source is temporarily stopped and all differential memory images are migrated to the virtual memory at the migration destination. When synchronization is completed, the I/O process in the server programs 41110 and 42110 is resumed.

Although this embodiment shows the process flow to carry out the data migration in advance, it is also possible to carry out the server migration in advance and to carry out the data migration of the volume thereafter. The present invention will not be limited by any of these configurations.

According to the above-described second embodiment of the present invention, in order to determine the migration destination, the I/O path not having the performance dependence relation relative to the I/O path containing the resource having the degraded performance is extracted as a candidate for the migration destination for improving the performance. In this way, it is possible to achieve the migration while considering the performance of the entire system and to apply an appropriate countermeasure even in the case of a complicated system configuration.

Third Embodiment

Figure 17:
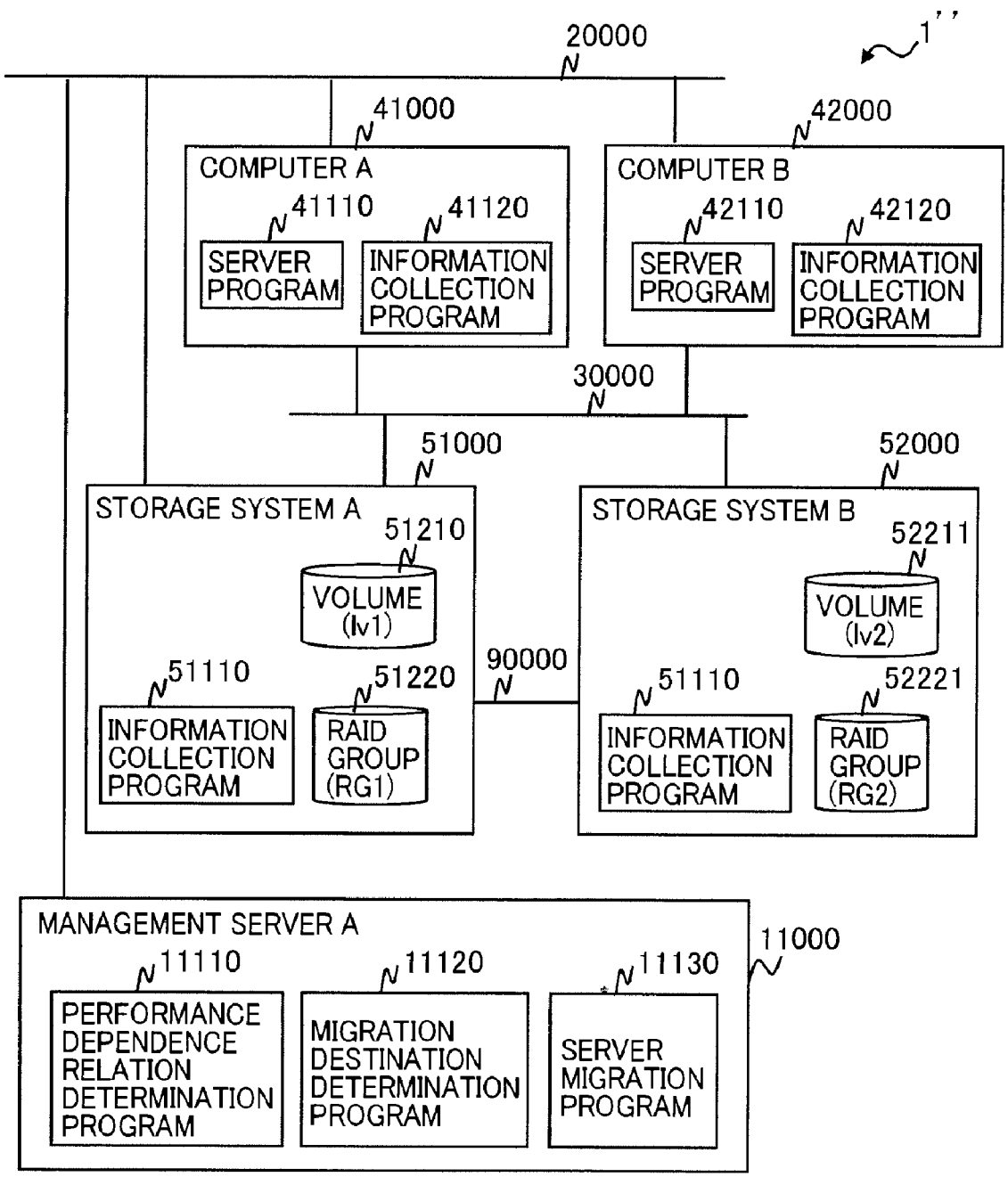
FIG. 17 is a block diagram showing a configuration example of a computer system 1" according to a third embodiment of the present invention.

Next, a third embodiment of the present invention will be described. FIG. 17 shows an example of a block configuration diagram of a computer system 1" of this embodiment.

The computer system 1" includes: one or more computers 41000 and 42000 provided respectively with an information collection program 41120 and 42120 and a server program 41110 and 42110; one or more storage systems 51000 and 52000 provided respectively with an information collection program 51110 and 52110; and one or more management servers 11000 provided with a performance dependence relation determination program 11110, a migration destination determination program 11120, and a server migration program 11130.

In this embodiment, the information collection programs 41110, 42110, 51110, and 52110 included in the computers 41000 and 42000 and the storage systems 52000 and 52000 are assumed to be retained in the computers 41000 and 42000 and the storage systems 51000 and 52000. However, it is possible to operate these programs in a separate information collection program server or in the management server 11000. In addition, the server migration program 11130 is assumed to be implemented in the management server 11000, but it is also possible to provide a separate server migration management server and to implement the program thereon or to operate the program on another computer to be appropriately determined.

Here, to simplify the description, the computer system 1" of this embodiment is assumed to include two computers 41000 (a computer A) and 42000 (a computer B), two storage systems 51000 (a storage system A) and 52000 (a storage system B) each retaining a volume data migration function, and a management server 11000 (a management server A). And these devices are mutually coupled through a Fibre Channel network 30000.

The server programs 41110 and 42110 on the respective computers 41000 and 42000 represent virtual computers, each of which includes a migration mechanism of the computer. Meanwhile, the two storage systems 51000 and 52000 are mutually coupled through a communication path 90000 such as a data bus.

This configuration allows the storage systems 51000 and 52000 to be coupled to each other, as modules, the respective storage systems 51000 and 52000 share the internal bus through the communication path 90000. In this way, this configuration allows the computers 41000 and 42000 to utilize the multiple storage systems 51000 and 52000 collectively as a single storage.

The storage system A (51000), as a volume 51210 (volume v1), provides the computer A (41000) with a logical volume made of a RAID group 51220 (RG1) while the storage system B (52000), as a volume 51211 (volume v2), provides the computer B (42000) with a logical volume made of a RAID group 51221 (RG2).

Here, for a mode of coupling among the computer A, the computer B, the storage system A (51000), and the storage system B (52000), it is possible to apply direct coupling by use of a Fibre Channel network 30000 as shown in FIG. 17, or to establish coupling through one or more network devices such as Fibre Channel switches.

Moreover, although the Fibre Channel network 30000 is used for the coupling among the computer A, the computer B, the storage system A (51000), and the storage system B (52000) in this embodiment, it is also possible to use a network of a different type as long as it is a data communication network. For instance, an Internet protocol (IP) network maybe employed. Further, a high-speed network for data communication is also used between the two storage systems 51000 and 52000.

Figure 18:
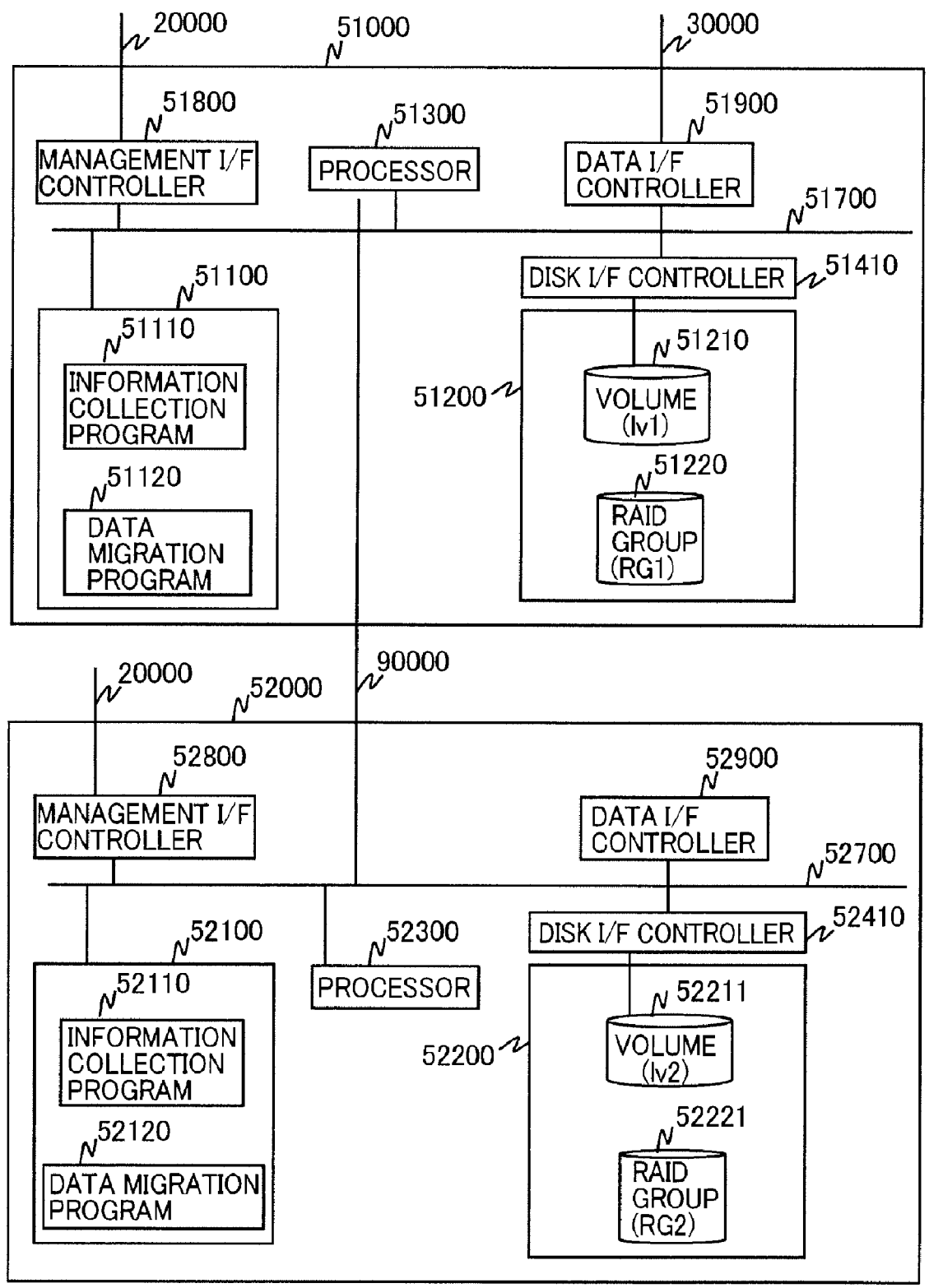
FIG. 18 is a block diagram showing a configuration example of storage systems 51000 and 52000 according to the third embodiment of the present invention.

Next, the storage systems 51000 and 52000 will be described. FIG. 18 is a block diagram showing a configuration example of the storage systems 51000 and 52000.

In this embodiment, the multiple storage systems 51000 and 52000 are mutually coupled through the communication path 90000 such as the data bus. The basic configuration of each of the storage systems 51000 and 52000 is similar to that in the first embodiment and therefore the description will be omitted.

In this embodiment, the multiple storage systems 51000 and 52000 collectively constitute a cluster structure, whereby it is possible to store the I/O from the computers 41000 and 42000 into any areas in the respective storage systems 51000 and 52000. Moreover, the configuration of the management server 11000 is similar to that in the first embodiment while the configurations of the computers 41000 and 42000 are similar to that in the second embodiment. Therefore, the description will be omitted likewise.

Further, individual information to be stored respectively in a server storage mapping table 11151, performance information tables 11152 and 11152', configuration/performance information history table 11153, and a reserved volume table 11154 are the same as those in the first embodiment and therefore the description will be omitted.

Figure 19:
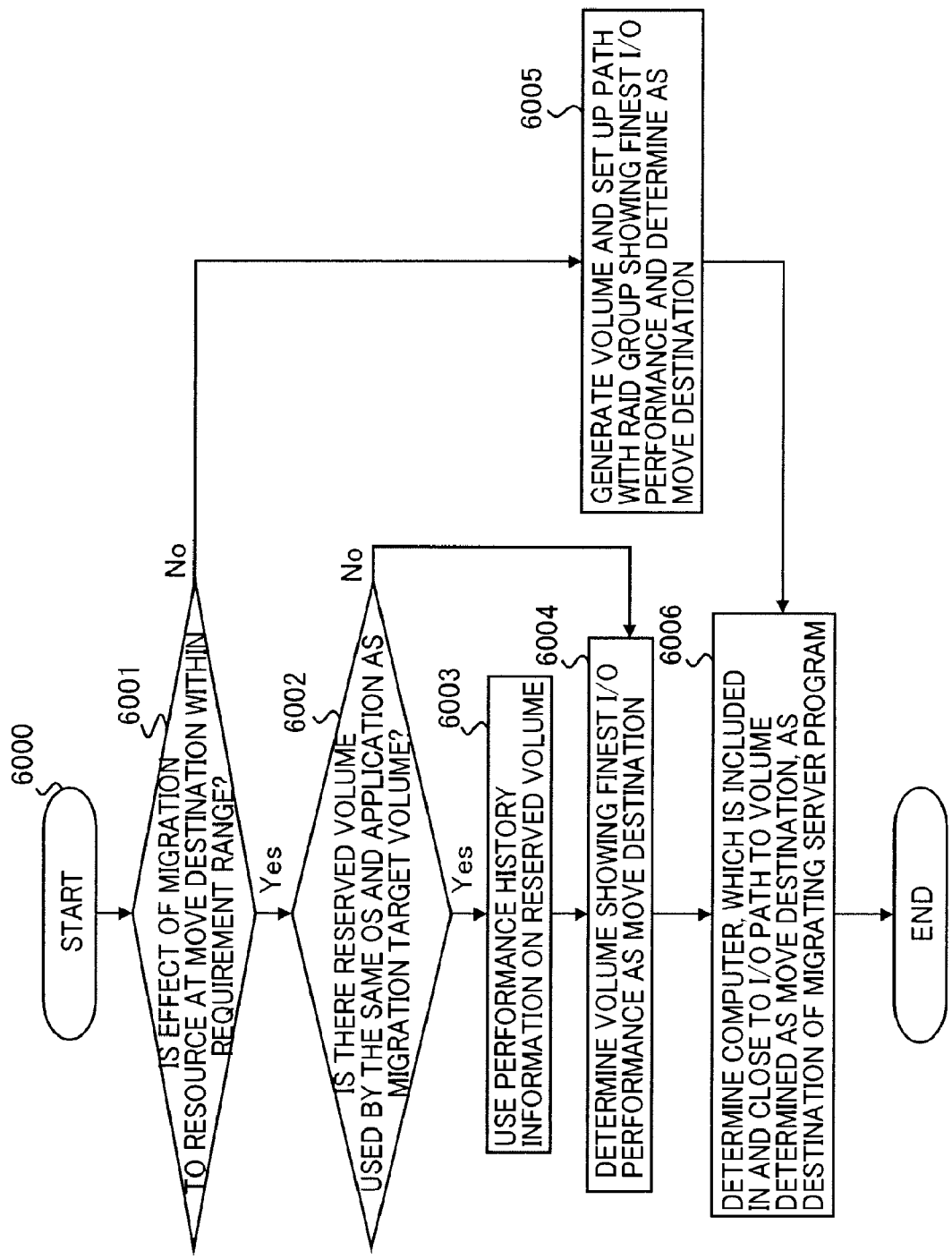
FIG. 19 is a flowchart showing an example of a migration destination determination process by a migration destination determination program 11120 according to the third embodiment of the present invention.

Next, a migration destination determination process to be carried out by a migration destination determination program 11120 on the management server 11000 in this embodiment will be described. FIG. 19 is a flowchart showing a process flow of this migration destination determination process.

This process is carried out when the processor 11300 of the management server 11000 executes the migration destination determination program 11120 stored in the memory 11100.

This process is executed when an event such as performance degradation of the computer 41000 or 42000 occurs in the computer system 1". This process is intended to determine the migration destination of the server program 41110 or 42110 and to instruct migration to the determined migration destination. Unless otherwise specified, each of the following steps in this process flow will be carried out by the processor 11300 on the management server 11000.

The contents of the process from Step 6001 to Step 6005 in the flowchart of FIG. 19 are similar to Step 3001 to Step 3005 of the first embodiment, and therefore the description will be omitted.

After the migration destination of the volume is determined either in Step 6004 or in Step 6005, the processor 11300 determines a computer included in an I/O path to the volume determined as the migration destination and having a short distance for the migration destination of the server programs 41110 and 42110 (Step 6006).

Here, an index indicating the distance between the server and the storage system 51000 or 52000 is determined by use of a hop number indicating the number of stages of switches used for coupling, an actual physical distance between the storage systems 51000 and 52000, and the like.

The migration process herein is similar to the process described with reference to FIG. 16 in the second embodiment, and therefore the description will be omitted. Moreover, although this embodiment shows the process flow to carry out the data migration in advance, it is also possible to carry out the server migration in advance and to carry out the data migration of the volume thereafter as similar to the second embodiment.

As described above, according to the third embodiment of the present invention, when any one of the migration of the server program 41110 or 42110 or the migration of the volume is executed, the candidate for the migration destination is determined while considering the distance between the server and the storage system 51000 or 52000 when determining the migration destination of the server program 41000 or 42110 so as not to cause a result of a failure to obtain an effect of performance improvement due to an increase in the distance between the server and the storage system 51000 or 52000 used by the server. In this way, it is possible to achieve the migration while considering the performance of the entire system and to apply an appropriate countermeasure even in the case of a complicated system configuration.

Although the present invention has been described in view of certain embodiments with reference to the accompanying drawings, the present invention is not limited only to these embodiments. It should be understood that the present invention encompasses any modified examples or equivalents without departing from the scope of the invention as defined in the appended claims.

What is claimed is:

1. A management computer mutually coupled to a computer on which software is working and to a storage system having a memory device providing a logical volume to be used by the software, the management computer comprising:
   a performance dependence relation determining unit implemented through executing a corresponding program by a processor of the management computer, the performance dependence relation determining unit
      extracts an I/O path containing a resource in which a predetermined event occurs, when the event occurs in the resource contained in the I/O path from the computer to the memory device, the memory device belonging to the logical volume used by the software working on the computer; and
      determines whether or not there is another I/O path not shared by any resources contained in the I/O path and used by another computer and another logical volume which are not using the I/O path containing the resource in which the event occurs; and
   a migration destination determining unit implemented through executing a corresponding program by a processor of the management computer, the migration destination determining unit
      determines, when the performance dependence relation determining unit determines that there is the another I/O path, whether or not a performance of a resource contained in the another I/O path is retained within a preset range of a threshold requirement in the case of migrating the computer and the logical volume to the another I/O path, based on information representing the performance of the resource contained in the another I/O path; and
      determines the another I/O path as a migration destination of the computer and the logical volume upon determination that the performance of the resource is retained within the range of the threshold requirement.

2. The management computer according to claim 1, wherein the migration destination determining unit outputs through a display device a notification information indicating a deficit of a resource for migrating the computer and the logical volume when the migration destination determining unit determines that there is no other I/O path which does not share resources contained in an I/O path containing the resource in which the event is occurred.

3. The management computer according to claim 1, wherein when the migration destination determining unit determines that the performance of the resource contained in the another I/O path is not retained within the preset range of the threshold requirement in the case of migrating the computer and the logical volume to the another I/O path, the migration destination determining unit forms a logical volume by use of the storage device determined to have the best performance information, among the storage devices constituting the another logical volume, based on performance information of the storage device contained in the another I/O path, sets an I/O path to the computer to be migrated, and determines the I/O path as the migration destination of the computer and the logical volume.

4. The management computer according to claim 1, wherein
when migrating the logical volume used by the software to the another logical volume, the migration destination determining unit further determines, based on performance information of the storage device, whether or not there is any other logical volume having a history of being used by software identical to the software as the another logical volume, and
the migration destination determining unit determines the another logical volume as the migration destination of the logical volume when the migration destination determining unit determines that there is the another logical volume.

5. The management computer according to claim 4, wherein, when the migration destination determining unit determines that there is no other logical volume having the history of being used by the software identical to the software, the migration destination determining unit determines a storage device with the best performance information, among the storage devices constituting the another logical volume, as the migration destination of the logical volume.

6. The management computer according to claim 1, wherein the performance information includes any one of I/O response time of the storage device, an I/O amount per unit time, and an I/0 transfer rate.

7. The management computer according to claim 1, wherein the migration destination determining unit retains a logical volume which is not used by any software in the computer as the another logical volume to be the migration destination, and records performance information of the logical volume.

8. A method of operating a management computer mutually coupled to a computer on which software is working and to a storage system having a memory device providing a logical volume to be used by the software, the management computer including a performance dependence relation determining unit and a migration destination determining unit implemented by executing a program by a processor, the method comprising:
an extracting step implemented by the performance dependence relation determining unit that extracts an I/O path containing a resource in which a predetermined event occurs, when the event occurs in the resource contained in the I/O path from the computer to the memory device belonging to the logical volume used by the software working on the computer;
a determining step implemented by the performance dependence relation determining unit that determines whether or not there is another I/O path not shared by any resources contained in the I/O path and used by another computer and another logical volume which are not using the I/O path containing the resource in which the event occurs;
a determining step implemented by the migration destination determining unit that determines, when it is determined that there is the another I/O path, whether or not a performance of a resource contained in the another I/O path is retained within a preset range of a threshold requirement in the case of migrating the computer and the logical volume to the another I/O path, based on information representing the performance of the resource contained in the another I/O path; and
a determining step implemented by the migration destination determining unit that determines the other I/O path as a migration destination of the computer and the logical volume upon determination that the performance of the resource is retained within the range of the threshold requirement.

9. A management computer mutually coupled to a computer on which software is working and to a storage system having a memory device providing a logical volume to be used by the software, the management computer comprising:
a migration destination determining unit implemented through executing a corresponding program by a processor of the management computer, the performance dependence relation determining unit
determines, based on performance information of the storage device to which the logical volume belongs, whether or not there is another logical volume being used by software identical to the software as the another logical volume, when migrating the logical volume used by the software to the another logical volume, and
determines the another logical volume as a migration destination of the logical volume, when it is determined that there is the other logical volume.

10. The management computer according to claim 9, wherein, when the migration destination determining unit determines that there is no other logical volume having history of being used by the software identical to the software, the migration destination determining unit determines a storage device with the best performance information among the storage devices constituting the another logical volume, as the migration destination of the logical volume.

11. The management computer according to claim 9, wherein the performance information comprises any one of I/O response time of the storage device, an I/O amount per unit time, and an I/O transfer rate.

12. The management computer according to claim 9, wherein the migration destination determining unit retains a logical volume which is not used by any software in the computer as the logical volume to be migration destination, and records performance information of the logical volume.

* * * * *